US010896299B2

(12) United States Patent
Kakizawa et al.

(10) Patent No.: US 10,896,299 B2
(45) Date of Patent: Jan. 19, 2021

(54) INFORMATION PROCESSING DEVICE AND INFORMATION PROCESSING METHOD

(71) Applicant: FELICA NETWORKS, INC, Tokyo (JP)

(72) Inventors: Miki Kakizawa, Saitama (JP); Naotaka Takeshita, Tokyo (JP); Jun Tada, Tokyo (JP); Shinichi Kato, Tokyo (JP)

(73) Assignee: FELICA NETWORKS, INC., Tokyo (JP)

( * ) Notice: Subject to any disclaimer, the term of this patent is extended or adjusted under 35 U.S.C. 154(b) by 24 days.

(21) Appl. No.: 15/560,414

(22) PCT Filed: Feb. 25, 2016

(86) PCT No.: PCT/JP2016/055714
§ 371 (c)(1),
(2) Date: Sep. 21, 2017

(87) PCT Pub. No.: WO2016/158120
PCT Pub. Date: Oct. 6, 2016

(65) Prior Publication Data
US 2018/0075266 A1 Mar. 15, 2018

(30) Foreign Application Priority Data
Mar. 31, 2015 (JP) .................. 2015-072104

(51) Int. Cl.
*G06K 7/10* (2006.01)
*G06F 3/06* (2006.01)
*G06K 19/07* (2006.01)

(52) U.S. Cl.
CPC ......... *G06K 7/10297* (2013.01); *G06F 3/061* (2013.01); *G06F 3/0659* (2013.01); *G06F 3/0671* (2013.01); *G06K 19/0723* (2013.01)

(58) Field of Classification Search
CPC ............ G06K 7/10297; G06K 19/0723; G06F 3/061; G06F 3/0659; G06F 3/0671
USPC .......................................... 235/382
See application file for complete search history.

(56) References Cited

U.S. PATENT DOCUMENTS

| 6,944,166 B1* | 9/2005 | Perinpanathan ........ H04L 47/10 370/352 |
| 2002/0146032 A1* | 10/2002 | Attimont ........... H04L 12/40169 370/448 |
| 2003/0039210 A1* | 2/2003 | Jin .......................... H04L 47/10 370/229 |

(Continued)

FOREIGN PATENT DOCUMENTS

| EP | 2506191 A1 | 10/2012 |
| JP | 2011-502301 A | 1/2011 |

(Continued)

OTHER PUBLICATIONS

International Search Report and Written Opinion of PCT Application No. PCT/JP2016/055714, dated May 10, 2016, 09 pages of ISRWO.

*Primary Examiner* — Daniel A Hess
(74) *Attorney, Agent, or Firm* — Chip Law Group

(57) ABSTRACT

Provided is an information processing device including: an access control unit configured to control access to a data storage location in which data can be stored and which is accessed through each of a plurality of communications including a wired communication and a wireless communication.

15 Claims, 13 Drawing Sheets

(56) References Cited

U.S. PATENT DOCUMENTS

2006/0135172 A1* 6/2006 Dronne ............... H04L 47/10
                                                    455/452.2
2013/0272284 A1  10/2013 Tsumagari et al.
2015/0003242 A1*  1/2015 Han ............... H04W 28/0268
                                                     370/230

FOREIGN PATENT DOCUMENTS

| JP | 2012-048640 A | 3/2012 |
| JP | 2013-222244 A | 10/2013 |
| JP | 2015-029352 A | 2/2015 |
| WO | 2010/027327 A1 | 3/2010 |

\* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/055714 filed on Feb. 25, 2016, which claims priority benefit of Japanese Patent Application No. JP 2015-072104 filed in the Japan Patent Office on Mar. 31, 2015. Each of the above-referenced applications is hereby incorporated herein by reference in its entirety.

TECHNICAL FIELD

The present disclosure relates to an information processing device, an information processing method, and a program.

BACKGROUND ART

For example, devices including an IC chip adaptable to near field communication (NFC), a universal integrated circuit card (UICC), a subscriber identity module (SIM) card, or the like (such as mobile phones and smartphones, for example) are becoming popular. The above-described IC chip, UICC, or SIM card functions as a data storage location in which data can be stored, and is accessed through each of a plurality of communications including a wired communication and a wireless communication.

Meanwhile, a technology for utilizing "a data storage location in which data can be stored and which is accessed through each of a plurality of communications including a wired communication and a wireless communication" such as the above-described IC chip has been developed. An example of the technology is a technology described in Patent Literature 1 below.

CITATION LIST

Patent Literature

Patent Literature 1: JP 2015-029352A

DISCLOSURE OF INVENTION

Technical Problem

To "a data storage location in which data can be stored and which is accessed through each of a plurality of communications including a wired communication and a wireless communication" (hereinafter briefly referred to as a "data storage location" in some cases), access such as reading out data or writing data is performed through a communication with an external device such as a reader/writer (hereinafter also referred to as "R/W" in some cases) related to NFC, an application, or the like, for example. In addition, for example, various services that utilize data stored in a data storage location such as an IC chip adaptable to NFC are spreading, and it is assumed that access to a data storage location will be increased more and more in the future.

Here, as access to a data storage location increases, a collision of access to the data storage location (or a communication collision), for example, is more likely to occur. Moreover, occurrence of a collision of access to the data storage location could exercise an influence upon provision of a service that utilizes data stored in the data storage location, such as a failure to provide the service, for example.

The present disclosure proposes an information processing device, an information processing method, and a program being novel and improved that can reduce a collision of access to a data storage location in which data can be stored and which is accessed through each of a plurality of communications including a wired communication and a wireless communication.

Solution to Problem

According to the present disclosure, there is provided an information processing device including: an access control unit configured to control access to a data storage location in which data can be stored and which is accessed through each of a plurality of communications including a wired communication and a wireless communication.

In addition, according to the present disclosure, there is provided an information processing device including: an access control unit configured to control access to a data storage location in which data can be stored and which is accessed through each of a plurality of communications including a wired communication and a wireless communication. The access control unit causes the data storage location to set a priority order of access in the plurality of communications.

In addition, according to the present disclosure, there is provided an information processing method executed by an information processing device, the method including: a step of controlling access to a data storage location in which data can be stored and which is accessed through each of a plurality of communications including a wired communication and a wireless communication.

In addition, according to the present disclosure, there is provided a program for causing a computer to execute: a step of controlling access to a data storage location in which data can be stored and which is accessed through each of a plurality of communications including a wired communication and a wireless communication.

Advantageous Effects of Invention

According to the present disclosure, a collision of access to a data storage location in which data can be stored and which is accessed through each of a plurality of communications including a wired communication and a wireless communication can be reduced.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
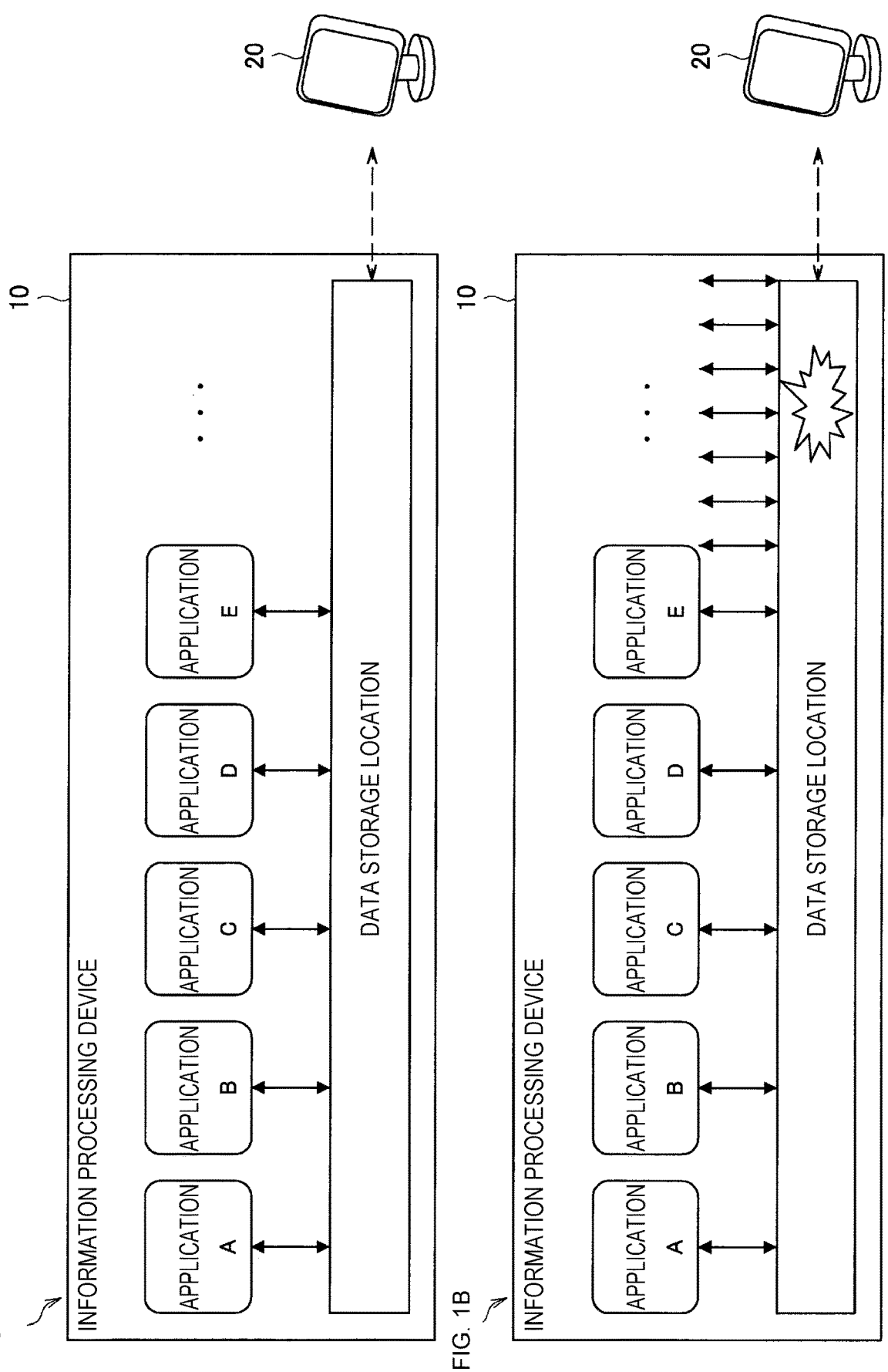
FIGS. 1A and 1B are illustrations for describing an overview of an information processing method according to the present embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, description will be provided below in the following order.
1. Information processing method according to the present embodiment
2. Information processing device according to the present embodiment
3. Program according to the present embodiment
(Information Processing Method According to the Present Embodiment)

Before describing a configuration of an information processing device according to the present embodiment, an information processing method according to the present embodiment will be described first. Hereinafter, the information processing method according to the present embodiment will be described citing, as an example, a case where the information processing device according to the present embodiment performs processing related to the information processing method according to the present embodiment.

[1] Overview of Information Processing Method According to the Present Embodiment As described above, as access to "a data storage location in which data can be stored and which is accessed through each of a plurality of communications including a wired communication and a wireless communication" increases, occurrence of a collision of access to the data storage location, for example, could exercise an influence upon provision of a service that utilizes data stored in the data storage location, such as a failure to provide the service.

Examples of the data storage location according to the present embodiment include an IC chip adaptable to NFC, UICC, a SIM card, and like.

Moreover, access to the data storage location according to the present embodiment refers to, for example, one or both of reading out data stored in the data storage location and writing data into the data storage location.

Furthermore, examples of data stored in the data storage location according to the present embodiment include non-secure data for which authentication is not required for access and secure data which can be accessed in a case where authentication has been completed.

As a specific example, citing, as an example, data related to a service that utilizes NFC, examples of non-secure data include data indicative of value balance and history, data indicative of value change date and time, and data indicative of details of value change (such as details of settlement). Moreover, citing, as an example, data related to a service that utilizes NFC, examples of secure data include device information (such as ID of reader/writer, for example) related to value change, positional information of an information processing device including the data storage location, and device information (such as ID, for example) of the information processing device. Note that, as a matter of course, examples of data stored in the data storage location according to the present embodiment are not limited to data related to a service that utilizes NFC. Hereinafter, a case where data stored in the data storage location according to the present embodiment is data related to a service that utilizes NFC as described above will be cited as an example.

Access to the data storage location according to the present embodiment is performed through a wired communication of any communication scheme, such as a communication based on the ISO 7816 standard, or a wireless communication of any communication scheme, such as NFC, a communication in accordance with the IEEE 802.11 standard, and a communication in accordance with the IEEE 802.15.1 standard, for example. In addition, access to the data storage location according to the present embodiment may be performed in a case where authentication via a communication has been completed (in a case where authentication via a communication has been terminated normally).

Hereinafter, a case where the data storage location according to the present embodiment is an IC chip adaptable to NFC that can be accessed through each of a wired communication by a communication based on the RS-232C serial standard, ETSI TS 102 612 (SWP) standard, ISO 7816 standard, or the like and a wireless communication by NFC will be cited as an example. Note that examples of the data storage location according to the present embodiment are not limited to the examples shown above. For example, the data storage location according to the present embodiment may be configured to be accessed through a wired communication and a plurality of identical or different wireless communications.

FIGS. 1A and 1B are illustrations for describing an overview of the information processing method according to the present embodiment, and shows an information processing device 10 to which the information processing method according to the present embodiment is not applied.

As shown at FIG. 1A, a data storage location included in the information processing device 10 is accessed through a wired communication by each of an application A, an application B, . . . executed by a processor or the like in the information processing device 10, for example. The data storage location included in the information processing device 10 is also accessed through a wireless communication by NFC by a reader/writer 20 in NFC, for example.

As shown at FIG. 1A, the data storage location included in the information processing device 10 is accessed through a wired communication by each of the application A, the application B, . . . . Thus, as the number of applications accessible to the data storage location increases, a collision of access is more likely to occur in the data storage location as shown at FIG. 1B. Furthermore, in a case where a collision of access has occurred, a failure or delay in processing related to access to the data storage location in each of the applications and the reader/writer 20 may occur.

Thus, in a case where a collision of access has occurred as described above, degradation in user convenience could occur, such as a failure to provide a user who receives a service that utilizes NFC at a brick-and-mortar store, a ticket gate, or the like with the service, occurrence of a delay in providing the service, or the like, for example.

Therefore, the information processing device according to the present embodiment controls access to the data storage location (access control processing).

For example, the information processing device according to the present embodiment executes an access control application that performs access control processing, and the access control processing according to the present embodiment is performed by the access control application. Examples of the access control application include an application at the same hierarchical level as an application accessible to the data storage location. In addition, the access control application can be implemented as middleware, for example.

Note that the access control processing according to the present embodiment may be implemented by hardware configured with a logic circuit and the like.

Hereinafter, a case where the access control processing according to the present embodiment is performed by an access control unit included in the information processing device according to the present embodiment will be mainly cited as an example.

Figure 2:
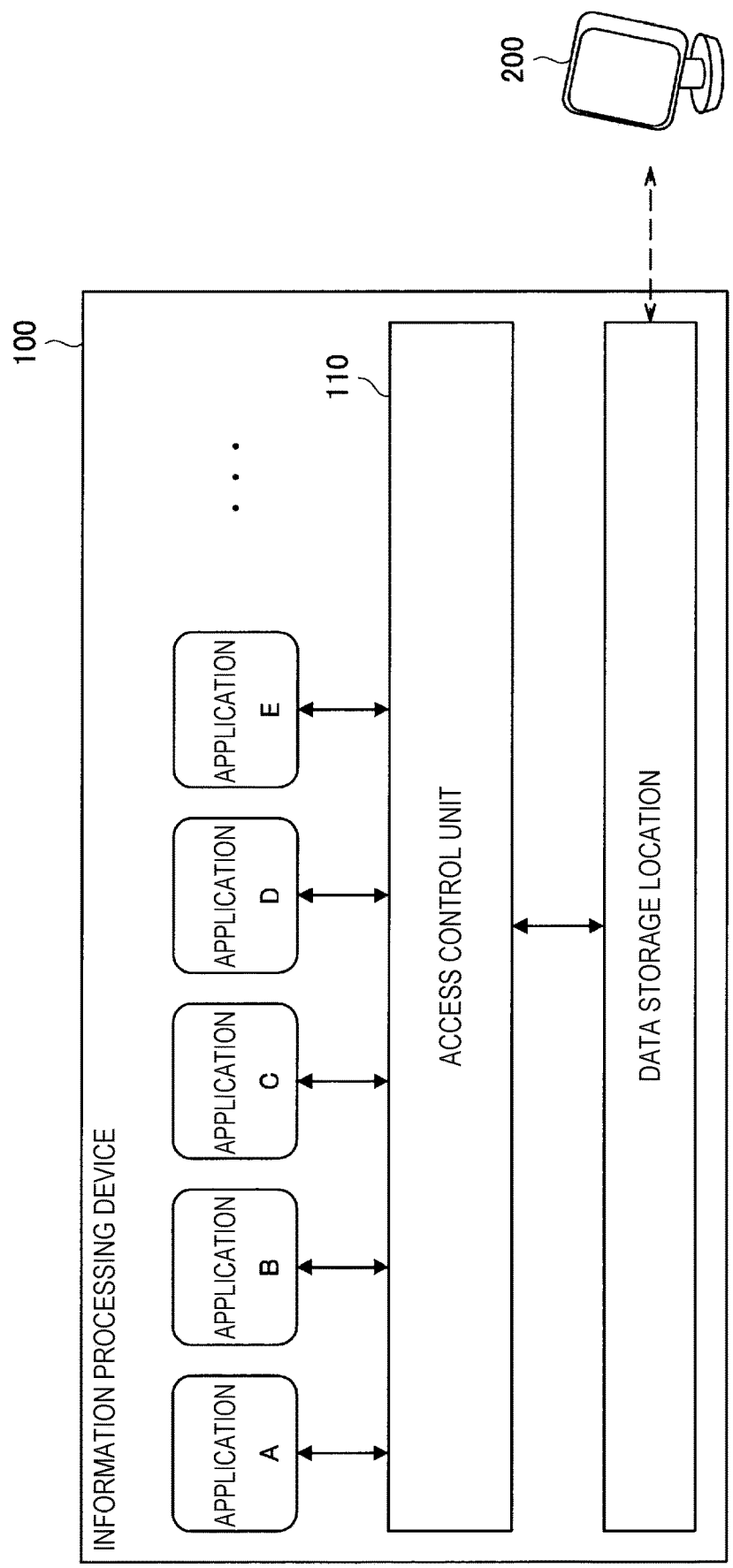
FIG. 2 is an illustration for describing an overview of an information processing method according to the present embodiment.

FIG. 2 is an illustration for describing an overview of the information processing method according to the present embodiment, and shows an example of an information processing device 100 to which the information processing method according to the present embodiment is applied.

FIG. 2 shows an example where the information processing device 100 includes a data storage location. Note that the data storage location according to the present embodiment may be a data storage location external to the information processing device 100.

In addition, FIG. 2 also shows a reader/writer 200 in NFC that performs access to the data storage location through a wireless communication by NFC.

The information processing device 100 includes an access control unit 110, and access to the data storage location is controlled by the access control unit 110 performing the access control processing according to the present embodiment.

As shown in FIG. 2, the data storage location included in the information processing device 100 is accessed by the access control unit 110 through a wired communication, for example. The data storage location included in the information processing device 100 is also accessed by the reader/writer 200 through a wireless communication by NFC, for example.

Moreover, the access control unit 110 acquires an access request that requests access to the data storage location transmitted from each of the application A, the application B, executed by a processor or the like in the information processing device 100.

Note that the applications according to the present embodiment are not limited to applications executed by a processor or the like in the information processing device 100. For example, the applications according to the present embodiment may be applications executed in an external device such as a server. In a case where the applications according to the present embodiment are applications executed in an external device, the information processing device 100 performs a communication with the external device via an internal communication device or an external communication device being connected to acquire an access request.

Examples of the access request according to the present embodiment include the following:
 a readout request to read out data from the data storage location (for example, data including a readout instruction)
 a writing request to write data into the data storage location (for example, data including a writing instruction; data to be written may further be included)
 a readout request and a writing request (or a writing request and a readout request).

Figure 3:
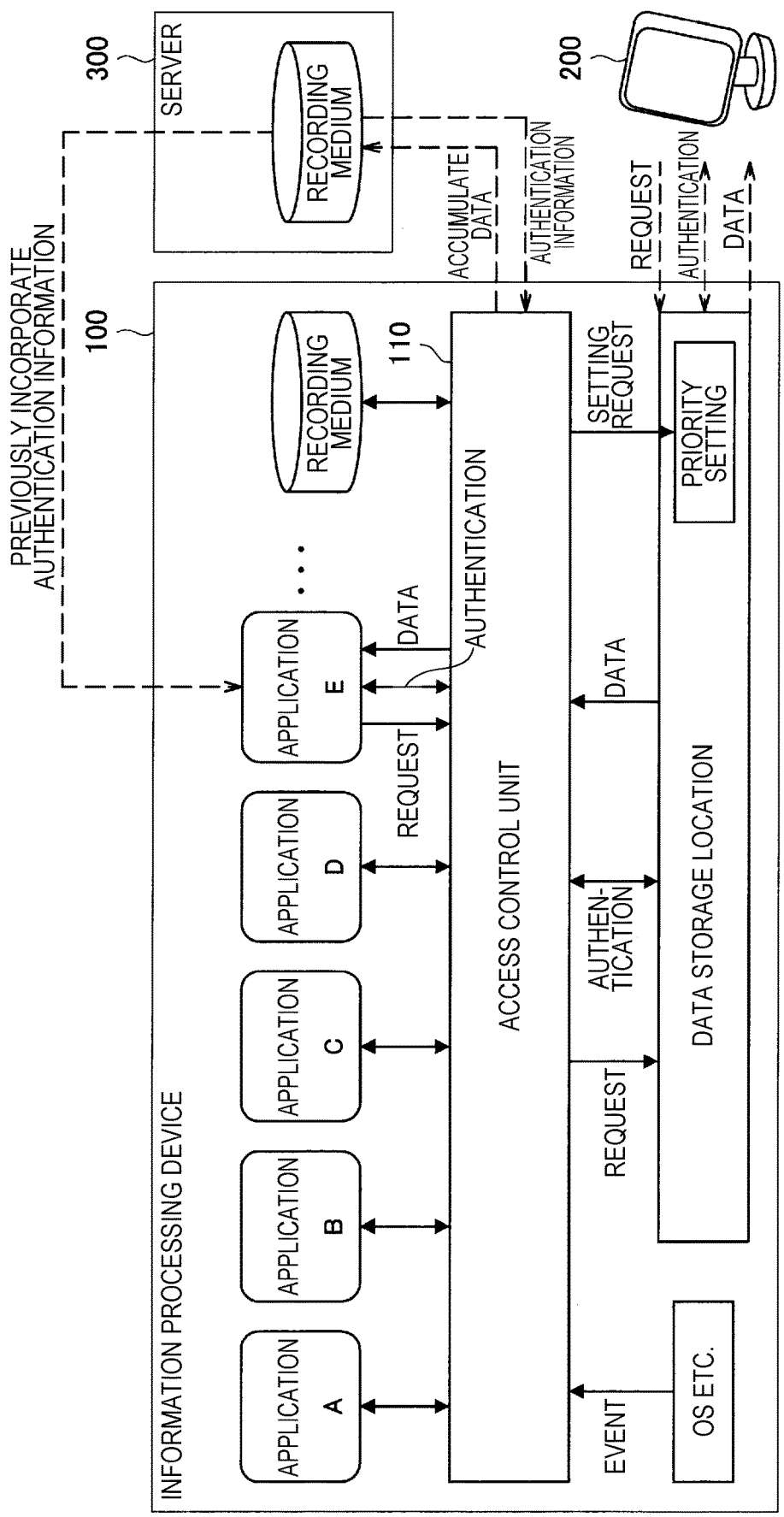
FIG. 3 is an illustration for describing an overview of an information processing method according to the present embodiment.

FIG. 3 is an illustration for describing an overview of the information processing method according to the present embodiment, and shows processing in the information processing device 100 and the reader/writer 200 shown in FIG. 2 more specifically.

Moreover, FIG. 3 further shows a server 300 which is an example of an external device of the information processing device 100. The server 300 plays various roles such as, for example, a role of storing data transmitted from the information processing device 100 in a recording medium, a role of transmitting authentication information for authentication to the information processing device 100, and a role of executing an application. The information processing device 100 and the server 300 perform a communication through any wired communication or any wireless communication via a network (or directly) by a communication device included in each device or an external communication device being connected, for example.

Hereinafter, the access control processing according to the present embodiment will be described with reference to FIG. 3 as necessary, citing, as an example, a case where the access control unit 110 of the information processing device 100 performs the access control processing related to the information processing method according to the present embodiment.

[1-1] First Example of Access Control Processing

The access control unit 110 collectively performs access to the data storage location by each of a plurality of applications.

As shown in FIG. 3, the access control unit 110 collectively performs access to the data storage location by each of the plurality of applications by mediating between each application of the application A, the application B, . . . and the data storage location.

Specifically, in a case where access requests are acquired from the respective applications, the access control unit 110 performs access to the data storage location based on the access requests in the order that the access requests have been acquired, for example.

When the access control unit 110 performs access to the data storage location based on the access requests in the order that the access requests have been acquired, access to the data storage location is controlled by the access control unit 110 even if the number of applications accessible to the data storage location increases. Thus, when the access control unit 110 performs access to the data storage location based on the access requests in the order that the access requests have been acquired, the likelihood that a collision of access occurs in the data storage location as in the information processing device 10 shown in FIGS. 1A and 1B will not be increased.

Moreover, in a case of mediating each application and the data storage location, acquisition of access requests from a plurality of applications may occur in a predetermined period.

Examples of the above-described predetermined period include "a period until a set time elapses after an access request is acquired from an application." In a case where the above-described predetermined period is "a period until a set time elapses after an access request is acquired from an application", the above-described predetermined period is equivalent to an acceptance period in the access control unit 110 during which access requests from a plurality of applications are accepted. The above-described set time may be a fixed time having been set previously, or may be a variable time that can be set as necessary by an operation by a user of the information processing device 100 or the like.

In a case where access requests are acquired from the plurality of applications in the predetermined period, the access control unit 110 may perform access to the data storage location based on the access requests in accordance with a priority order, for example.

The access control unit 110 decides the priority order based on the access requests by setting priorities for the access requests in accordance with details of the access requests, for example. The access control unit 110 assigns a higher priority order to an access request having a higher priority. Moreover, in a case where a plurality of access requests having the same priority exist, the access control unit 110 assigns a higher priority order to an access request acquired earlier, for example.

Here, a priority for an access request is set using details of an instruction included in the access request (such as settlement, charge, or data readout only, for example) and a table (or a database) in which details of the instruction and a priority are associated with each other, for example. Note that a method of setting a priority is not limited to the foregoing, but a priority may be set by any method capable of setting a priority, such as a method of setting a priority by an algorithm.

Examples of access to the data storage location based on access requests in accordance with the priority order include performing access to the data storage location based on the access requests in descending order of priority order and only performing access to the data storage location based on an access request having the highest priority order. In a case of only performing access to the data storage location based on an access request having the highest priority order, the access control unit 110 returns errors to applications related to other access requests different from the highest access request, for example.

In a case where access to the data storage location based on access requests is performed in accordance with the priority order, access to the data storage location is controlled by the access control unit 110 even if the number of applications accessible to the data storage location increases. Thus, even in the case where access to the data storage location based on access requests is performed in accordance with the priority order, the likelihood that a collision of access occurs in the data storage location as in the information processing device 10 shown in FIGS. 1A and 1B will not be increased.

When the access control processing according to the first example as described above, for example, is performed, access to the data storage location is controlled by the access control unit 110 even if the number of applications accessible to the data storage location increases. Thus, when the access control processing according to the first example as described above, for example, is performed, the likelihood that a collision of access occurs in the data storage location as in the information processing device 10 shown in FIGS. 1A and 1B will not be increased.

Therefore, when the access control processing according to the first example as described above, for example, is performed, the information processing device 100 can reduce a collision of access to the data storage location.

Note that the access control processing according to the first example is not limited to the above-described processing.

For example, in a case where data is read out from the data storage location through access to the data storage location, the access control unit 110 holds the readout data in a recording medium.

Examples of the recording medium in which the access control unit 110 holds data obtained by reading out data from the data storage location include a recording medium included in the information processing device 100, such as a storage unit (described later), an external recording medium connected to the information processing device 100, and a recording medium included in an external device such as the server 300 as shown in FIG. 3.

In a case where it is determined that a data acquisition condition having been set has been satisfied, for example, the access control unit 110 reads out data from the data storage location.

Here, examples of the data acquisition condition according to the present embodiment include one or more than one of a lapse of a predetermined time, sensing of a predetermined event, and acquisition of a predetermined instruction. As specific examples, examples (a) to (c) shown below are cited as the data acquisition condition according to the present embodiment. Sensing of each event shown in the examples (b) below is performed by an operating system (OS), a data storage location, or the like, for example, and when a signal indicating that an event has been sensed is transmitted from the OS, the data storage location, or the like, the access control unit 110 performs a determination for the data acquisition condition. Note that, as a matter of course, the access control unit 110 can perform sensing of an event depending on the type of event shown in the examples (b) below.

(a) First Examples of Data Acquisition Condition (Condition Related to a Lapse of a Predetermined Time)
 each time when a certain time elapses since any time point such as a time point when data is acquired last time
 each time when a time having been set at random elapses since any time point (b) Second Examples of Data Acquisition Condition (Condition Related to Sensing of a Predetermined Event)
 when the information processing device 100 is activated
 when an operation of turning on/off setting of NFC is sensed
 when a radio frequency (RF) transmitted from an external device such as the reader/writer 200 is sensed
 when a specific location is sensed (on the basis of positional information acquired from a GPS device, etc.)

when activation of a specific application is sensed
    when addition, deletion, or change of data stored in the data storage location is sensed
(c) Third Examples of Data Acquisition Condition (Condition Related to Acquisition of a Predetermined Instruction)
    when an instruction from an external device such as the reader/writer 200 is acquired
    when a data acquisition instruction from the OS, the data storage location, or the like is acquired In a case where any of the above-described lapse of a predetermined time, the above-described sensing of a predetermined event, and the above-described acquisition of a predetermined instruction as shown in (a) to (c) described above, for example, has been satisfied, the access control unit 110 determines that the data acquisition condition has been satisfied.

Note that, as a matter of course, examples of the data acquisition condition according to the present embodiment are not limited to the examples shown in (a) to (c) described above.

The data acquisition condition according to the present embodiment is set when the information processing device 100 is manufactured, when an access control application is installed (a case where the access control processing according to the present embodiment is implemented using software), or when a user operation related to setting of the data acquisition condition is performed, for example. Alternatively, the data acquisition condition according to the present embodiment may be set by being distributed from an external device such as the server 300, for example.

Note that the method of setting the data acquisition condition according to the present embodiment is not limited to the foregoing.

For example, the data acquisition condition according to the present embodiment may be set by an application such as the application A, the application B, . . . shown in FIG. 3. The application causes the access control unit 110 to set the data acquisition condition by including data indicative of the data acquisition condition in an access request to be transmitted to the access control unit 110 or transmitting data indicative of the data acquisition condition to the access control unit 110 along with an access request, for example.

When the access control unit 110 reads out data from the data storage location in a case where it is determined that the set data acquisition condition has been satisfied, timing of access to the data storage location by the access control unit 110 is controlled. Therefore, when the access control unit 110 reads out data from the data storage location in a case where it is determined that the set data acquisition condition has been satisfied, the likelihood that a collision of access occurs in the data storage location can be reduced more.

For example, when a readout request (an example of an access request) is acquired from an application, and in a case where data corresponding to the readout request is held in the recording medium, the access control unit 110 provides the application with the data held in the recording medium.

Examples of data corresponding to a readout request include data read out from a memory address indicated by the readout request, data that matches a data name indicated by the readout request, and the like.

In a case where data corresponding to a readout request is retrieved from the recording medium, for example, the access control unit 110 determines that the data corresponding to the readout request is held in the recording medium. In addition, in a case where data corresponding to the readout request is not retrieved from the recording medium, for example, the access control unit 110 does not determine that the data corresponding to the readout request is held in the recording medium.

Note that a method of determining whether data corresponding to the readout request is held in the recording medium is not limited to the foregoing.

For example, in a case where data corresponding to the readout request is retrieved from the recording medium, for example, and a period settled by a time stamp of the retrieved data and the current time is shorter than a predetermined period (or in a case where the settled period is less than or equal to the predetermined period), the access control unit 110 determines that the data corresponding to the readout request is held in the recording medium. In addition, even if data corresponding to the readout request is retrieved from the recording medium, for example, in a case where a period settled by a time stamp of the retrieved data and the current time is more than or equal to a predetermined period (or in a case where the settled period is longer than the predetermined period), the access control unit 110 does not determine that the data corresponding to the readout request is held in the recording medium.

That is, the access control unit 110 can also determine whether the data corresponding to the readout request is held in the recording medium depending on freshness of data held in the recording medium.

Moreover, when a readout request (an example of an access request) is acquired from an application, and in a case where data corresponding to the readout request is not held in the recording medium, the access control unit 110 reads out data from the data storage location. Here, the access control unit 110 may read out data from the data storage location in a case where the data acquisition condition has been satisfied as described above.

Then, the access control unit 110 provides the application with data read out from the data storage location. By transmitting the readout data to the application as a response to the access request transmitted from the application, the access control unit 110 provides the application with the data read out from the data storage location. At this time, the access control unit 110 may simultaneously record the data read out from the data storage location in the recording medium, for example.

Here, the access control unit 110 provides the application with the data read out from the data storage location, for example, each time when it is read out.

In addition, the access control unit 110 may provide the application with the data read out from the data storage location in a case where a set data transfer condition has been satisfied, for example.

The data transfer condition according to the present embodiment is set by an application such as the application A, the application B, . . . shown in FIG. 3, for example. The application causes the access control unit 110 to set the data transfer condition by including data indicative of the data transfer condition in an access request to be transmitted to the access control unit 110 or transmitting data indicative of the data transfer condition to the access control unit 110 along with an access request, for example.

Examples of the data transfer condition according to the present embodiment include each time when data is read out, when a predetermined number of pieces of data or a predetermined amount of data is read out, and the like.

For example, as described above, when a readout request is acquired from an application, and in a case where data corresponding to the readout request is held in the recording medium, it is possible to reduce access to the data storage location by the access control unit 110 by the provision of the data held in the recording medium to the application. Therefore, when the access control unit 110 provides the data held in the recording medium to the application in the case where the data corresponding to the readout request is held in the recording medium as described above, for example, the likelihood that a collision of access occurs in the data storage location can be reduced more.

In a case where the access control processing according to the first example as described above, for example, is performed, access to the data storage location by each of a plurality of applications is performed collectively by the access control unit 110.

Therefore, when the access control processing according to the first example as described above, for example, is performed, the information processing device 100 can reduce a collision of access to the data storage location in which data can be stored and which is accessed through each of a plurality of communications including a wired communication and a wireless communication.

In addition, when the access control processing according to the first example as described above, for example, is performed and access to the data storage location is performed collectively by the access control unit 110, power consumption for access to the data storage location, for example, can be reduced.

[1-2] Second Example of Access Control Processing

The access control unit 110 causes the data storage location to set a priority order of access in a plurality of communications.

The access control unit 110 transmits a setting request including an instruction to set a priority of communication to the data storage location, as shown in FIG. 3, for example.

Examples of the setting request according to the present embodiment include communication identification information indicative of a communication to be processed preferentially (in the example of FIG. 3, for example, ID indicative of a wired communication for access from the access control unit 110, ID indicative of an NFC communication for access from an external device such as the reader/writer 200, etc.) and an instruction to process the communication indicated by the communication identification information preferentially.

The access control unit 110 decides a communication to be processed preferentially on the basis of an operation of setting a priority by a user of the information processing device 100 or the like, for example. Then, the access control unit 110 transmits a setting request corresponding to the decided communication to be processed preferentially to the data storage location.

Alternatively, the access control unit 110 may determine a communication to be processed preferentially in accordance with details of an access request acquired from an application, for example, and may transfer a setting request corresponding to the result of determination to the data storage location.

The access control unit 110 decides a priority of communication corresponding to the access request using details of an instruction (such as settlement, charge, data readout only, for example) included in the access request and a table (or a database) in which details of the instruction and a priority of communication are associated with each other, for example. Moreover, the access control unit 110 determines whether the access request is to be processed preferentially by threshold processing of the priority of communication and a threshold value having been set.

Then, in a case where it is determined that the access request is to be processed preferentially, for example, the access control unit 110 transmits, to the data storage location, a setting request including communication identification information indicative of ID indicative of a wired communication for access from the access control unit 110. In addition, in a case where it is not determined that the access request is to be processed preferentially, for example, the access control unit 110 transmits, to the data storage location, a setting request including communication identification information indicative of ID indicative of an NFC communication for access from an external device.

Note that, as a matter of course, the setting request according to the present embodiment is not limited to the above-shown examples.

The data storage location having acquired the setting request sets a priority of communication on the basis of the setting request, for example. The data storage location sets a priority of communication by storing communication identification information and a flag indicating that the priority is high, for example. Note that, as a matter of course, a method of setting the priority in the data storage location is not limited to the foregoing.

Then, the data storage location performs processing related to access through a communication having a high priority preferentially over another communication.

Here, the meaning that "the data storage location performs processing related to access through a communication having a high priority preferentially over another communication" according to the present embodiment refers to performing processing related to access through a communication having a high priority earlier than processing related to access through another communication or only performing processing related to access through a communication having a high priority, for example.

In a case where processing related to access through a communication having a high priority is performed earlier than another communication, it is possible to avoid a failure in the other communication. In addition, in a case of only performing processing related to access through a communication having a high priority, the data storage location returns an error through another communication different from the communication having a high priority, for example.

By transmitting a setting request to the data storage location as described above, for example, the access control unit 110 causes the data storage location to set the priority order of access in a plurality of communications.

When the priority order of access in a plurality of communications is set in the data storage location, a communication collision in a plurality of communications is avoided in the data storage location, and thus, a collision of access to the data storage location is prevented.

Therefore, when the access control processing according to the second example as described above, for example, is performed, the information processing device 100 can reduce a collision of access to the data storage location in which data can be stored and which is accessed through each of a plurality of communications including a wired communication and a wireless communication.

[1-3] Third Example of Access Control Processing

The access control unit 110 can also perform both the access control processing according to the first example shown in [1-1] described above and the access control processing according to the second example shown in [1-2] described above, as the access control processing according to the present embodiment.

When the access control processing according to the second example is performed, the information processing device 100 can provide effects provided by the access control processing according to the first example shown in [1-1] described above and effects provided by the access control processing according to the second example shown in [1-2] described above.

The information processing device 100 according to the present embodiment performs access control processing as described above, for example, as processing related to the information processing method according to the present embodiment.

Therefore, the information processing device 100 can reduce a collision of access to the data storage location in which data can be stored and which is accessed through each of a plurality of communications including a wired communication and a wireless communication.

Note that the above-described access control processing is a division of the processing related to the information processing method according to the present embodiment, for the sake of convenience. Thus, in the processing related to the information processing method according to the present embodiment, it is possible to regard the above-described access control processing as two or more processes (by any dividing technique), for example.

[2] An Example of Processing Related to the Information Processing Method According to the Present Embodiment Next, the above-described processing related to the information processing method according to the present embodiment will be described more specifically. Hereinafter, an example of the above-described processing related to the information processing method according to the present embodiment will be shown citing, as an example, processing in an information processing system including the information processing device 100 shown in FIG. 2 or FIG. 3.

Figure 4:
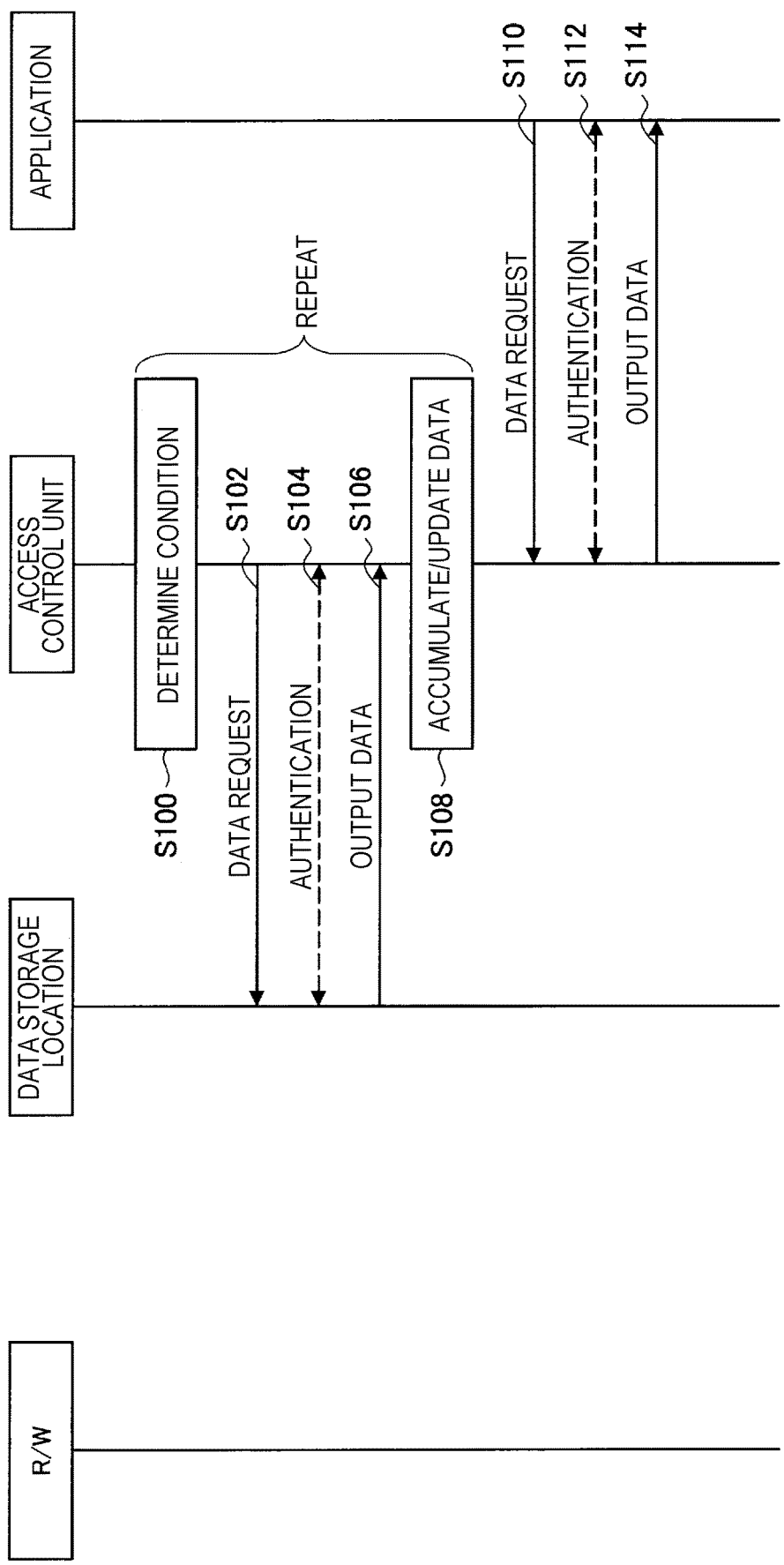
FIG. 4 is an illustration for describing a first example of processing related to the information processing method according to the present embodiment.

[2-1] First Example of Processing Related to the Information Processing Method According to the Present Embodiment FIG. 4 is an illustration for describing a first example of the processing related to the information processing method according to the present embodiment, and shows an example of a case where the access control processing according to the first example shown in [1-1] described above is performed in the information processing device 100.

The access control unit 110 determines whether a data acquisition condition has been satisfied (S100).

In a case where it is determined in step S100 that the data acquisition condition has been satisfied, the access control unit 110 transmits, to the data storage location, a data request including information indicative of data to be read out (data indicative of a memory address, data name, etc., for example) and an instruction to output data (S102).

In addition, in a case where information indicative of data to be read out (such as data indicative of a memory address, data name, and data type, for example) included in the data request is secure data, for example, authentication is performed between the access control unit 110 and the data storage location (S104).

In a case where the processing in step S104 is not performed, or in a case where authentication according to step S104 has been completed, the data storage location transmits data corresponding to the data request to the access control unit 110 (S106).

The access control unit 110 having acquired the data transmitted in step S106 records the acquired data in a recording medium (S108). Here, in a case where the acquired data has not been stored in the recording medium, for example, the access control unit 110 newly records the acquired data in the recording medium, or in a case where the acquired data has been stored in the recording medium, the access control unit 110 overwrites the recording medium with the acquired data for update.

Each time when it is determined in step S100 that the data acquisition condition has been satisfied, for example, the access control unit 110 repeats the processing of steps S102 through S108.

An application transmits a data request (an example of an access request) including a readout request to the access control unit 110 (S110). In a case where information indicative of data to be read out included in the data request is secure data, for example, authentication is performed between the access control unit 110 and the application (S112).

In a case where processing in step S112 is not performed or in a case where authentication according to step S110 has been completed, the access control unit 110 transmits data corresponding to the data request acquired in step S110 to the application (S114).

When the processing shown in FIG. 4, for example, is performed, the access control unit 110 can collectively perform access to the data storage location through each of a plurality of applications.

Figure 5:
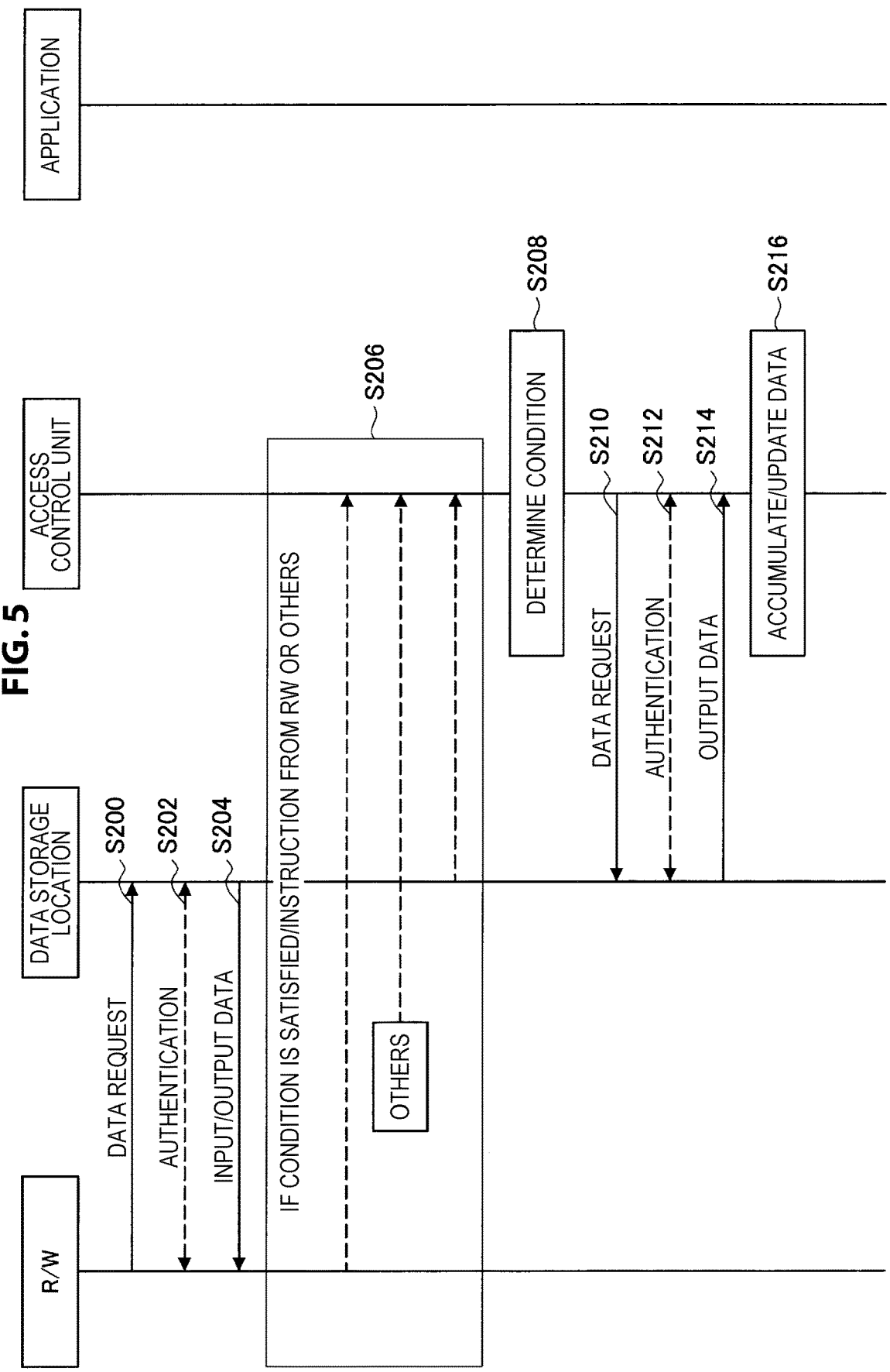
FIG. 5 is an illustration for describing a second example of processing related to the information processing method according to the present embodiment.

[2-2] Second Example of Processing Related to the Information Processing Method According to the Present Embodiment FIG. 5 is an illustration for describing a second example of the processing related to the information processing method according to the present embodiment, and shows another example of a case where the access control processing according to the first example shown in [1-1] described above is performed in the information processing device 100.

The reader/writer 200 transmits a data request including an access request to the data storage location through NFC using carrier waves of a predetermined frequency such as 13.56 [MHz] (S200).

In addition, in a case where data to be a target of the access request included in the data request is secure data, for example, authentication is performed between the reader/writer 200 and the data storage location (S202).

In a case where processing in step S202 is not performed or in a case where authentication according to step S202 has been completed, the data storage location performs processing in accordance with the access request included in the data request, and transmits data corresponding to the data request to the reader/writer 200 (S204). Here, in a case where the data storage location plays a role of a responder in NFC, for example, the data storage location transmits data corresponding to the data request by performing load modulation.

An event shown in the above-described examples (b) is sensed in the reader/writer 200, the data storage location, OS, or the like, and a signal indicating that the event has been sensed is transmitted to the access control unit 110 (S206).

The access control unit 110 determines whether the data acquisition condition has been satisfied on the basis of the signal transmitted in step S206, for example (S208).

In a case where it is determined in step S208 that the data acquisition condition has been satisfied, the access control unit 110 transmits a data request to the data storage location (S210), similarly to step S102 in FIG. 4.

In addition, authentication may be performed between the access control unit 110 and the data storage location (S212), similarly to step S104 in FIG. 4.

In a case where the processing in step S212 is not performed or in a case where authentication according to step S212 has been completed, the data storage location transmits data corresponding to the data request to the access control unit 110 (S214).

The access control unit 110 having acquired the data transmitted in step S214 records the acquired data in the recording medium (S216), similarly to step S108 in FIG. 4.

In a case where a data request transmitted from an application is acquired similarly to step S110 in FIG. 4, the access control unit 110 performs processing similar to steps S112 and S114 in FIG. 4.

When the processing shown in FIG. 5, for example, is performed, the access control unit 110 can collectively perform access to the data storage location by each of a plurality of applications.

Figure 6:
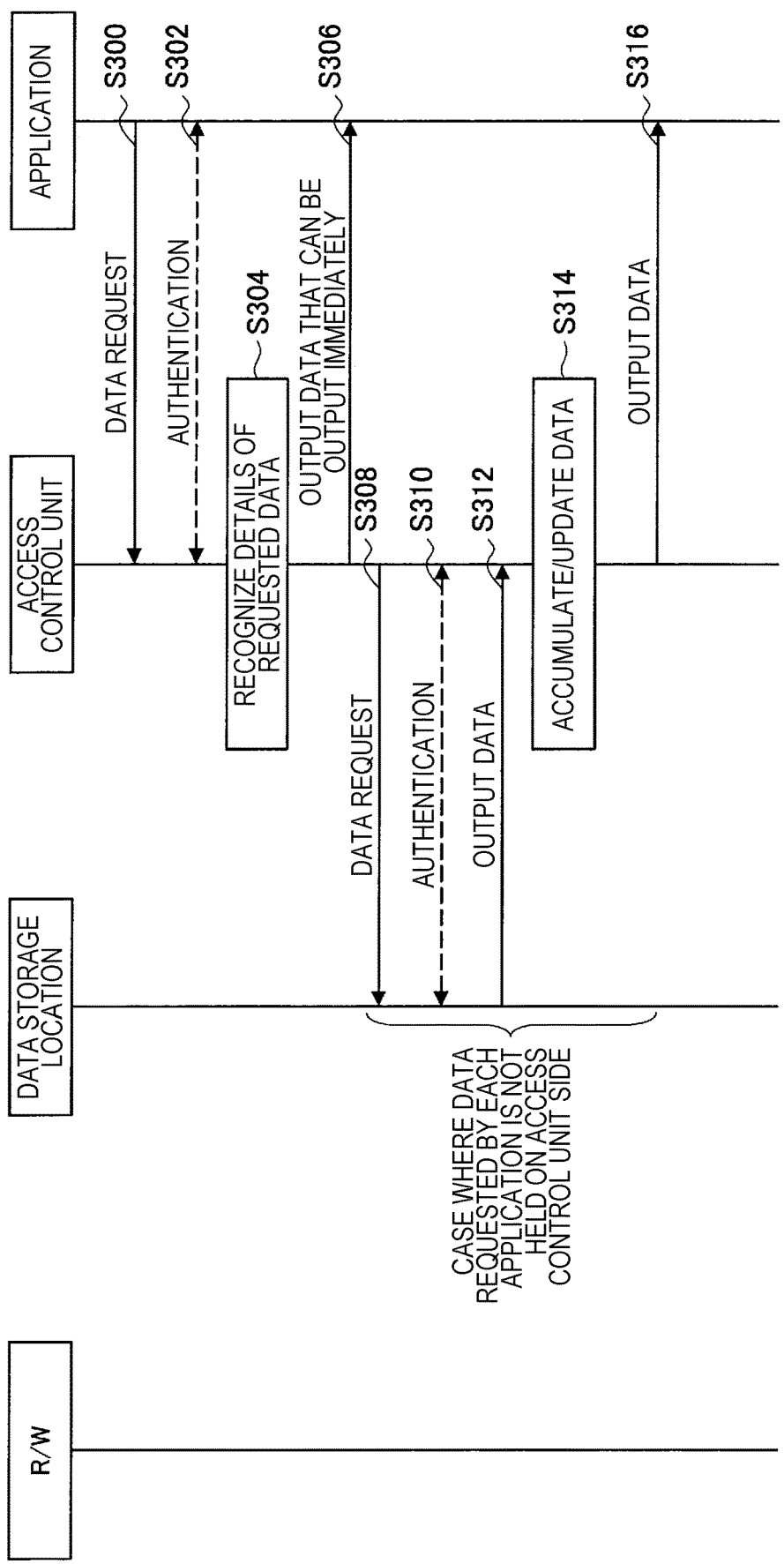
FIG. 6 is an illustration for describing a third example of processing related to the information processing method according to the present embodiment.

[2-3] Third Example of Processing Related to the Information Processing Method According to the Present Embodiment FIG. 6 is an illustration for describing a third example of the processing related to the information processing method according to the present embodiment, and shows another example of a case where the access control processing according to the first example shown in [1-1] described above is performed in the information processing device 100.

An application transmits a data request (an example of an access request) including a readout request to the access control unit 110 (S300). In addition, authentication may be performed between the access control unit 110 having acquired the data request and the application (S302), similarly to step S112 in FIG. 4, for example.

In a case where processing in step S302 is not performed or in a case where authentication according to step S302 has been completed, the access control unit 110 determines whether data corresponding to the data request acquired in step S110 has been stored in the recording medium, for example (S304).

In a case where it is determined in step S304 that the data corresponding to the data request has been stored in the recording medium, the access control unit 110 transmits the data stored in the storage medium to the application (S306).

In addition, in a case where it is not determined in step S304 that the data corresponding to the data request has been stored in the recording medium, the processing of steps S308 through S316 is performed, and data acquired from the data recording location is transmitted to the application.

Specifically, in a case where it is not determined in step S304 that the data corresponding to the data request has been stored in the recording medium, the access control unit 110 transmits a data request to the data storage location (S308), similarly to step S102 in FIG. 4.

In addition, authentication may be performed between the access control unit 110 and the data storage location (S310), similarly to step S104 in FIG. 4.

In a case where the processing in step S310 is not performed or in a case where authentication according to step S310 has been completed, the data storage location transmits data corresponding to the data request to the access control unit 110 (S312).

The access control unit 110 having acquired the data transmitted in step S312 records the acquired data in the recording medium (S314), similarly to step S108 in FIG. 4. Then, the access control unit 110 transmits the data transmitted in step S312 to the application as data corresponding to the data request (S316).

When the processing shown in FIG. 6, for example, is performed, the access control unit 110 can collectively perform access to the data storage location by each of a plurality of applications.

In addition, in a case where the processing shown in FIG. 6 is performed, for example, and when data corresponding to the data request transmitted from the application is held in the recording medium, the access control unit 110 transmits the data held in the recording medium to the application. Thus, when the processing shown in FIG. 6, for example, is performed, it is possible to reduce access to the data storage location by the access control unit 110.

Figure 7:
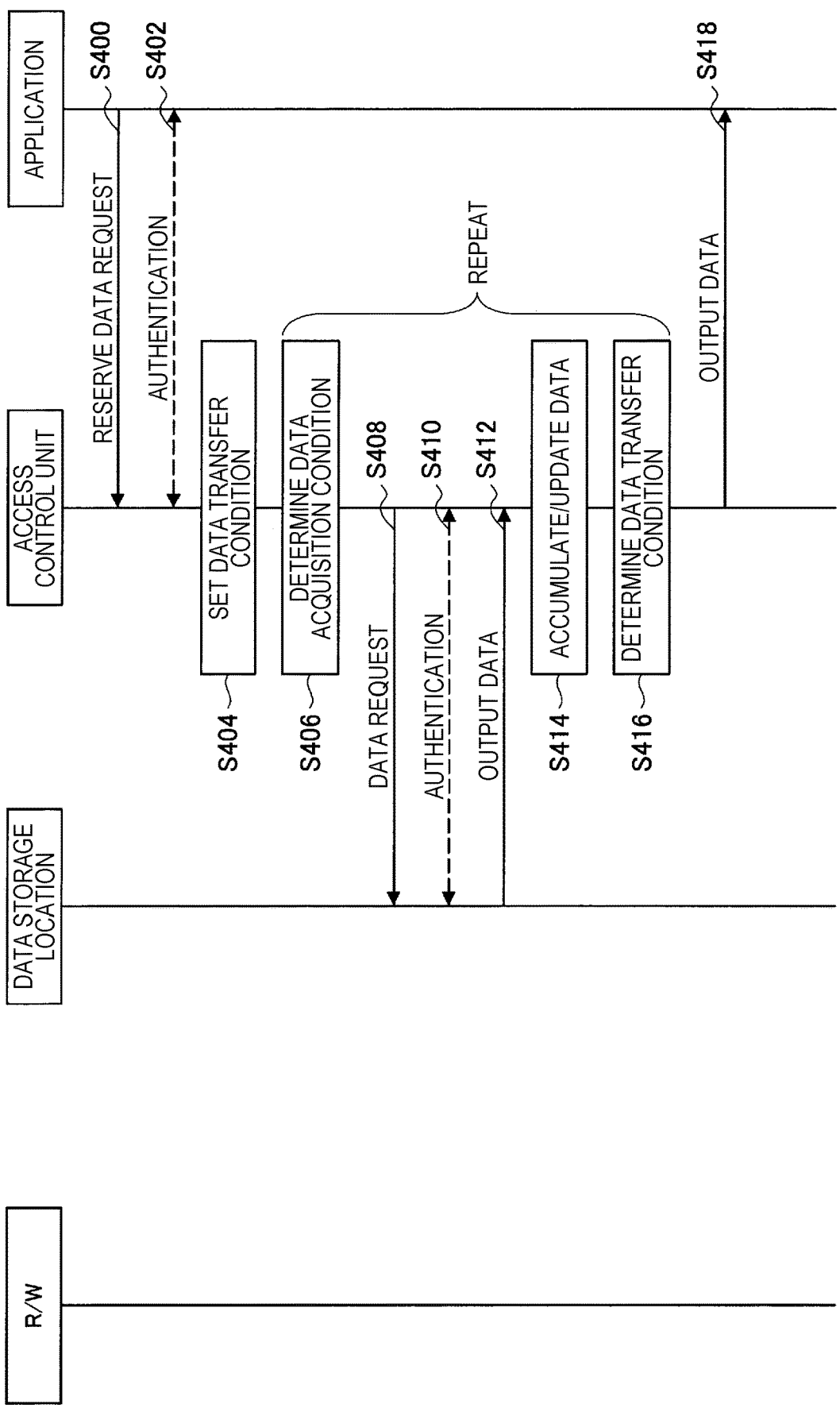
FIG. 7 is an illustration for describing a fourth example of processing related to the information processing method according to the present embodiment.

[2-4] Fourth Example of Processing Related to the Information Processing Method According to the Present Embodiment FIG. 7 is an illustration for describing a fourth example of the processing related to the information processing method according to the present embodiment, and shows another example of a case where the access control processing according to the first example shown in [1-1] described above is performed in the information processing device 100.

An application transmits a data request (an example of an access request) including a data transfer condition, a data acquisition condition, and a readout request, for example, to the access control unit 110 (S400). Here, a data request including one or both of the data transfer condition and the data acquisition condition corresponds to reserving transfer of data from the access control unit 110 to the application (shown as data request reservation in FIG. 4).

In addition, authentication may be performed between the access control unit 110 having acquired the data request in step S400 and the application (S402), similarly to step S112 in FIG. 4, for example.

The access control unit 110 sets a data transfer condition on the basis of the data transfer condition included in the data request acquired in step S400 (S404), and sets a data acquisition condition on the basis of the data acquisition condition included in the data request (S406).

The access control unit 110 determines whether the data acquisition condition set in step S406 has been satisfied (S406).

In a case where it is determined in step S406 that the data acquisition condition has been satisfied, the access control unit 110 transmits a data request to the data storage location (S408), similarly to step S102 in FIG. 4.

In addition, authentication may be performed between the access control unit 110 and the data storage location (S410), similarly to step S104 in FIG. 4.

In a case where the processing in step S410 is not performed or in a case where authentication according to step S410 has been completed, the data storage location transmits data corresponding to the data request to the access control unit 110 (S412).

The access control unit 110 having acquired the data transmitted in step S412 records the acquired data in the recording medium (S414), similarly to step S108 in FIG. 4.

Each time when it is determined in step S406 that the data acquisition condition has been satisfied, for example, the access control unit 110 repeats the processing of steps S408 through S416.

Moreover, the access control unit 110 determines whether the data transfer condition set in step S404 has been satisfied (S416).

In a case where it is determined in step S416 that the data transfer condition has been satisfied, the access control unit 110 transmits the data acquired from the data storage location and held in the recording medium, for example, to the application as data corresponding to the data request acquired in step S400 (S418).

When the processing shown in FIG. 7, for example, is performed, the access control unit 110 can collectively perform access to the data storage location by each of a plurality of applications.

Figure 8:
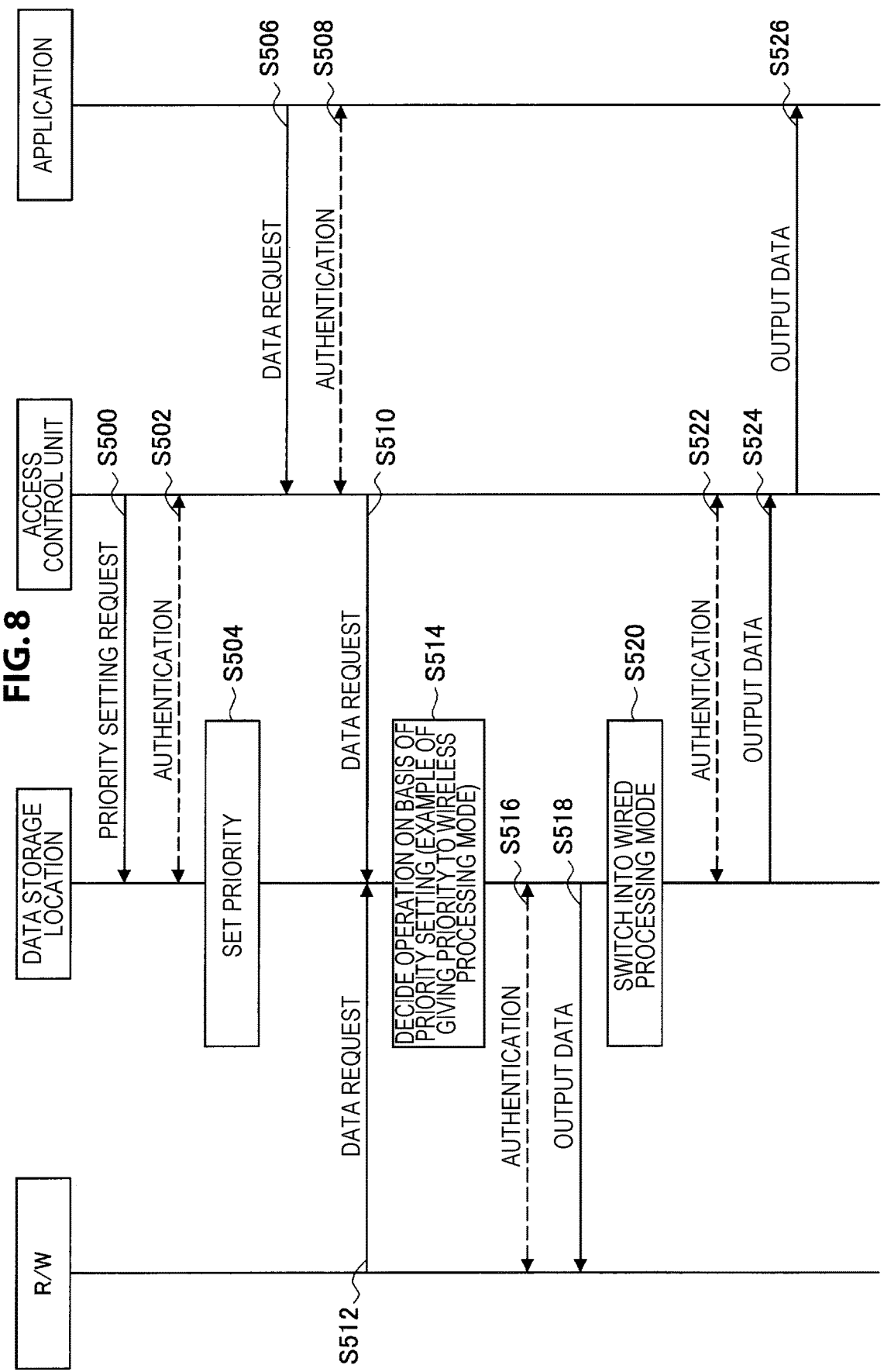
FIG. 8 is an illustration for describing a fifth example of processing related to the information processing method according to the present embodiment.

[2-5] Fifth Example of Processing Related to the Information Processing Method According to the Present Embodiment FIG. 8 is an illustration for describing a fifth example of the processing related to the information processing method according to the present embodiment, and shows an example of a case where the access control processing according to the second example shown in [1-2] described above is performed in the information processing device 100.

The access control unit 110 transmits a priority setting request to the data storage location (S500). The setting request is transmitted on the basis of a priority setting operation by a user of the information processing device 100 or the like, for example.

In addition, authentication is performed between the access control unit 110 and the data storage location (S502).

In a case where authentication according to step S502 has been completed, the data storage location sets a priority of communication on the basis of the setting request (S504). Then, the data storage location performs processing related to access through a communication having a high priority preferentially over another communication. In FIG. 8, a case where a high priority has been set for a communication by NFC (an example of a wireless communication) is cited as an example.

An application transmits a data request (an example of an access request) including a readout request to the access control unit 110 (S506). In addition, authentication may be performed between the access control unit 110 having acquired the data request and the application (S508), similarly to step S112 in FIG. 4, example. Then, the access control unit 110 transmits the data request to the data storage location (S510), similarly to step S102 in FIG. 4.

Here, in a case where the reader/writer 200 transmits the data request to the data storage location at the same (or substantially the same) timing as the processing in step S510 (S512), for example, the data storage location decides an operation on the basis of the priority having been set (S514). In the example of FIG. 8, since a high priority has been set for a communication by NFC (an example of a wireless communication) in step S504, the data storage location decides that processing related to the data request acquired from the reader/writer 200 is to be performed preferentially.

In a case where the processing related to the data request acquired from the reader/writer 200 is performed, authentication may be performed between the reader/writer 200 and the data storage location (S516), similarly to step S202 in FIG. 5.

In a case where the processing in step S516 is not performed or in a case where authentication according to step S516 has been completed, the data storage location performs processing in accordance with the access request included in the data request similarly to step S204 in FIG. 5, and transmits data corresponding to the data request to the reader/writer 200 (S518).

When the processing related to the data request acquired from the reader/writer 200 is completed, the data storage location performs switching into a mode of performing processing related to the data request acquired from the access control unit 110 (S520).

After the processing in step S520 is performed, authentication may be performed between the access control unit 110 and the data storage location (S522), similarly to step S104 in FIG. 4.

In a case where the processing in step S522 is not performed or in a case where authentication according to step S522 has been completed, the data storage location transmits data corresponding to the data request acquired in step S510 to the access control unit 110 (S524).

Moreover, the access control unit 110 transmits the data acquired from the data storage location to the application as data corresponding to the data request acquired in step S506 (S526). In addition, the access control unit 110 may hold the data acquired from the data storage location in the recording medium.

When the processing shown in FIG. 8, for example, is performed, the priority order of access in a plurality of communications is set in the data storage location. Thus, a communication collision in a plurality of communications is avoided in the data storage location as shown in FIG. 8, and therefore, a collision of access to the data storage location is prevented.

Figure 9:
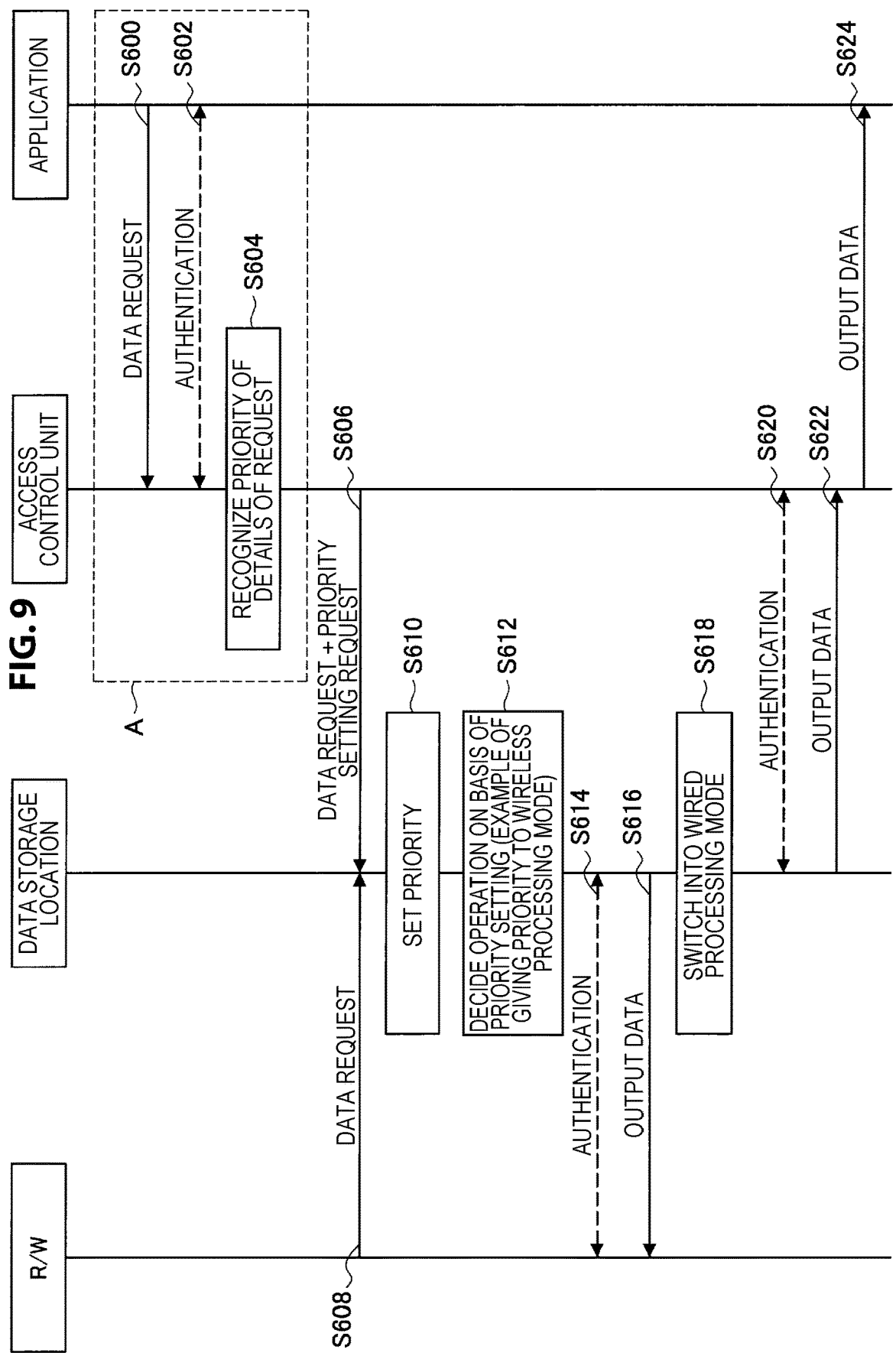
FIG. 9 is an illustration for describing a sixth example of processing related to the information processing method according to the present embodiment.

[2-6] Sixth Example of Processing Related to the Information Processing Method According to the Present Embodiment FIG. 9 is an illustration for describing a sixth example of the processing related to the information processing method according to the present embodiment, and shows another example of a case where the access control processing according to the second example shown in [1-2] described above is performed in the information processing device 100.

An application transmits a data request (an example of an access request) including a readout request to the access control unit 110 (S600). In addition, authentication may be performed between the access control unit 110 having acquired the data request and the application (S602), similarly to step S112 in FIG. 4, for example.

In a case where processing in step S602 is not performed or in a case where authentication according to step S602 has been completed, the access control unit 110 determines a communication to be processed preferentially in accordance with details of the access request included in the data request, for example (S604).

Then, the access control unit 110 transmits a data request to the data storage location, similarly to step S102 in FIG. 4, and transmits a priority setting request in accordance with the result of determination in step S604 to the data storage location (S606).

Here, in a case where the reader/writer 200 transmits the data request to the data storage location at the same (or substantially the same) timing as the processing in step S606 (S608), for example, the data storage location sets a priority of communication on the basis of the setting request the setting request acquired in step S606 (S610). Then, data storage location performs processing related to access through a communication having a high priority preferentially over another communication. In FIG. 9, a case where a high priority has been set for a communication by NFC (an example of a wireless communication) is cited as an example similarly to the fifth example of the processing related to the information processing method according to the present embodiment shown in FIG. 8.

The data storage location decides an operation on the basis of the priority having been set (S612). In the example of FIG. 9, a high priority has been set for the communication by NFC (an example of a wireless communication) in step S610, and thus, the data storage location decides that processing related to the data request acquired from the reader/writer 200 is to be performed preferentially.

In a case where the processing related to the data request acquired from the reader/writer 200 is performed, authentication may be performed between the reader/writer 200 and the data storage location (S614), similarly to step S202 in FIG. 5.

In a case where the processing in step S614 is not performed or in a case where authentication according to step S614 has been completed, the data storage location performs processing in accordance with the access request included in the data request similarly to step S204 in FIG. 5, and transmits data corresponding to the data request to the reader/writer 200 (S616).

When the processing related to the data request acquired from the reader/writer 200 is completed, the data storage location performs switching into a mode of performing processing related to the data request acquired from the access control unit 110 (S618).

After the processing in step S618 is performed, authentication may be performed between the access control unit 110 and the data storage location (S620), similarly to step S104 in FIG. 4.

In a case where the processing in step S522 is not performed or in a case where authentication according to step S620 has been completed, the data storage location transmits data corresponding to the data request acquired in step S620 to the access control unit 110 (S622).

Moreover, the access control unit 110 transmits the data acquired from the data storage location to the application as data corresponding to the data request acquired in step S606 (S626). In addition, the access control unit 110 may hold the data acquired from the data storage location in the recording medium.

When the processing shown in FIG. 9, for example, is performed, the priority order of access in a plurality of communications is set in the data storage location. Thus, a communication collision in a plurality of communications is avoided in the data storage location as shown in FIG. 9, and therefore, a collision of access to the data storage location is prevented.

Figure 10:
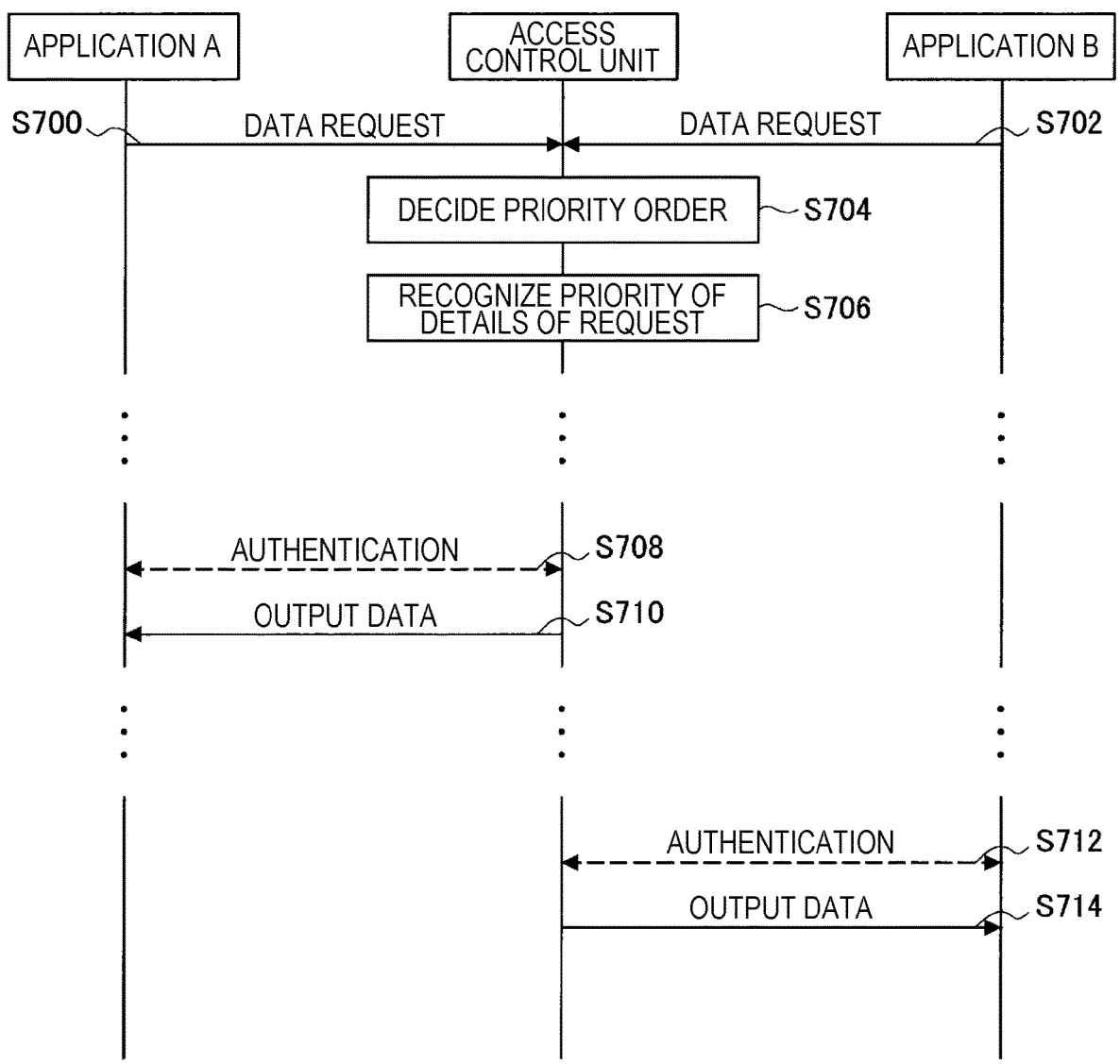
FIG. 10 is an illustration for describing a seventh example of processing related to the information processing method according to the present embodiment.

[2-7] Seventh Example of Processing Related to the Information Processing Method According to the Present Embodiment FIG. 10 is an illustration for describing a seventh example of the processing related to the information processing method according to the present embodiment, and shows an example of a case where the access control processing according to the third example shown in [1-3] described above is performed the information processing device 100.

As described above, transmission of access requests from a plurality of applications to the access control unit 110 may occur in a predetermined period. Therefore, FIG. 10 shows an example of processing in a case where the access control unit 110 acquires data requests including access requests from the application A and the application B at the same (or substantially the same) timing (an example of a predetermined period) as an example of a case where the access control processing according to the third example shown in [1-3] described above is performed.

Each of the application A and the application B transmits a data request (an example of an access request) including a readout request to the access control unit 110 (S700, S702).

As shown in FIG. 10, the access control unit 110 having acquired the data requests from the application A and the application B at the same (or substantially the same) timing (an example of a predetermined period) decides the priority order for the application A and the application B (S704). The access control unit 110 decides the priority order by setting priorities for the access requests in accordance with details of access requests included in the acquired data requests, for example. In FIG. 10, a case where it has been decided that the application A has a higher priority order than the application B is cited as an example.

In addition, the access control unit 110 determines a communication to be processed preferentially in accordance with details of the access requests included in the data requests (S706), similarly to step S604 in FIG. 9.

Here, the processing of steps S700 through S706 is equivalent to the processing of steps S600 through S604 shown at A in FIG. 9. The access control unit 110 transmits the data requests to the data storage location in accordance with the priority order decided in step S704. Moreover, processing similar to the processing of steps S606 through 622 in FIG. 9, for example, is performed in the access control unit 110, the data storage location, and the reader/writer 200, and the access control unit 110 acquires data corresponding to the data requests in accordance with the priority order.

After data is acquired from the data storage location as described above, authentication may be performed between the access control unit 110 and the applications (S708, S712), similarly to step S112 in FIG. 4, for example.

The access control unit 110 transmits the data acquired from the data storage location to the application A as data corresponding to the data request acquired in step S700 (S710). The access control unit 110 also transmits the data acquired from the data storage location to the application B as data corresponding to the data request acquired in step S702 (S714). In addition, the access control unit 110 may hold the data acquired from the data storage location in the recording medium.

When the processing shown in FIG. 10, for example, is performed, the access control unit 110 can collectively perform access to the data storage location by each of a plurality of applications.

In addition, the priority order of access in a plurality of communications is also set in the data storage location in the case where the processing shown in FIG. 10, for example, is performed, similarly to the sixth example of the processing related to the information processing method according to the present embodiment shown in FIG. 9. Thus, a communication collision in a plurality of communications is avoided in the data storage location as shown in FIG. 10, and therefore, a collision of access to the data storage location is prevented.

(Information Processing Device According to the Present Embodiment)

Next, an example of a configuration of an information processing device according to the present embodiment that can perform the above-described processing related to the information processing method according to the present embodiment will be described.

Figure 11:
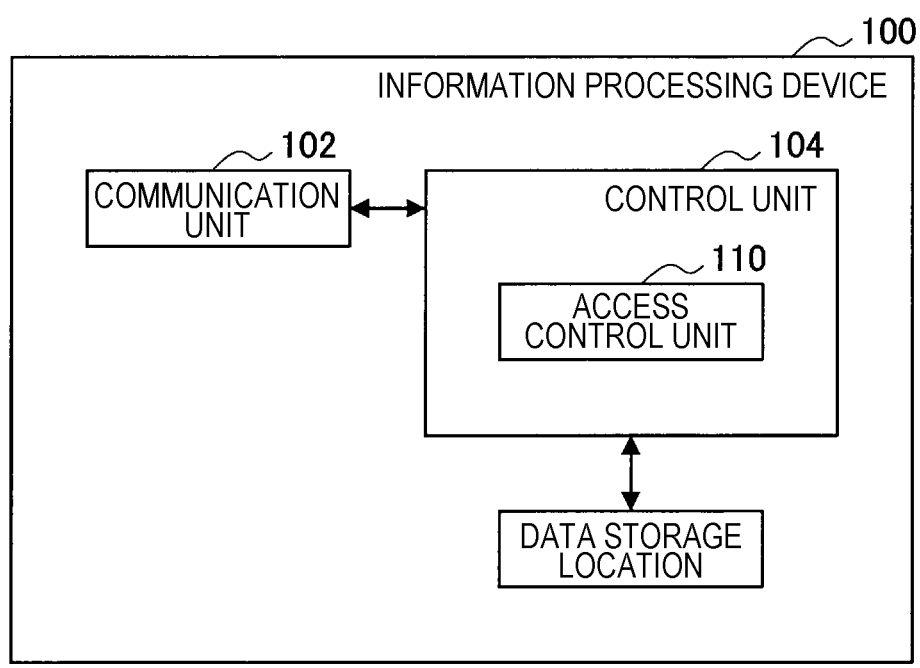
FIG. 11 is a block diagram showing an example of a configuration of an information processing device according to the present embodiment.

FIG. 11 is a block diagram showing an example of a configuration of the information processing device 100 according to the present embodiment. The information processing device 100 includes a communication unit 102 and a control unit 104, for example. In addition, FIG. 11 shows an example where the information processing device 100 includes a data storage location.

Moreover, the information processing device 100 may include a read only memory (ROM; not shown), a random access memory (RAM; not shown), a storage unit (not shown), an operating unit (not shown) that can be operated by a user, a display unit (not shown) that displays various screens on a display screen, and the like, for example. The information processing device 100 connects the above-described respective structural elements with a bus as a data transmission path, for example.

The ROM (not shown) stores control data such as programs, arithmetic parameters, and the like that the control unit 104 uses. The RAM (not shown) temporarily stores a program executed by the control unit 104 and the like.

The storage unit (not shown) is storage means included in the information processing device 100, and plays a role of the recording medium included in the information processing device 100 shown in FIG. 3, for example. The storage unit (not shown) stores various data such as, for example, data related to the information processing method according to the present embodiment such as data acquired from the data storage location and a table in which details of an instruction and a priority are associated with each other, and various applications. Here, examples of the storage unit (not shown) include a magnetic recording medium such as a hard disk, a nonvolatile memory such as a flash memory, and the like. In addition, the storage unit (not shown) may be attachable/detachable to/from the information processing device 100.

The operating unit (not shown) includes an operation input device which will be described later. In addition, the display unit (not shown) includes a display device which will be described later.

[Hardware Configuration Example of the Information Processing Device 100]

Figure 12:
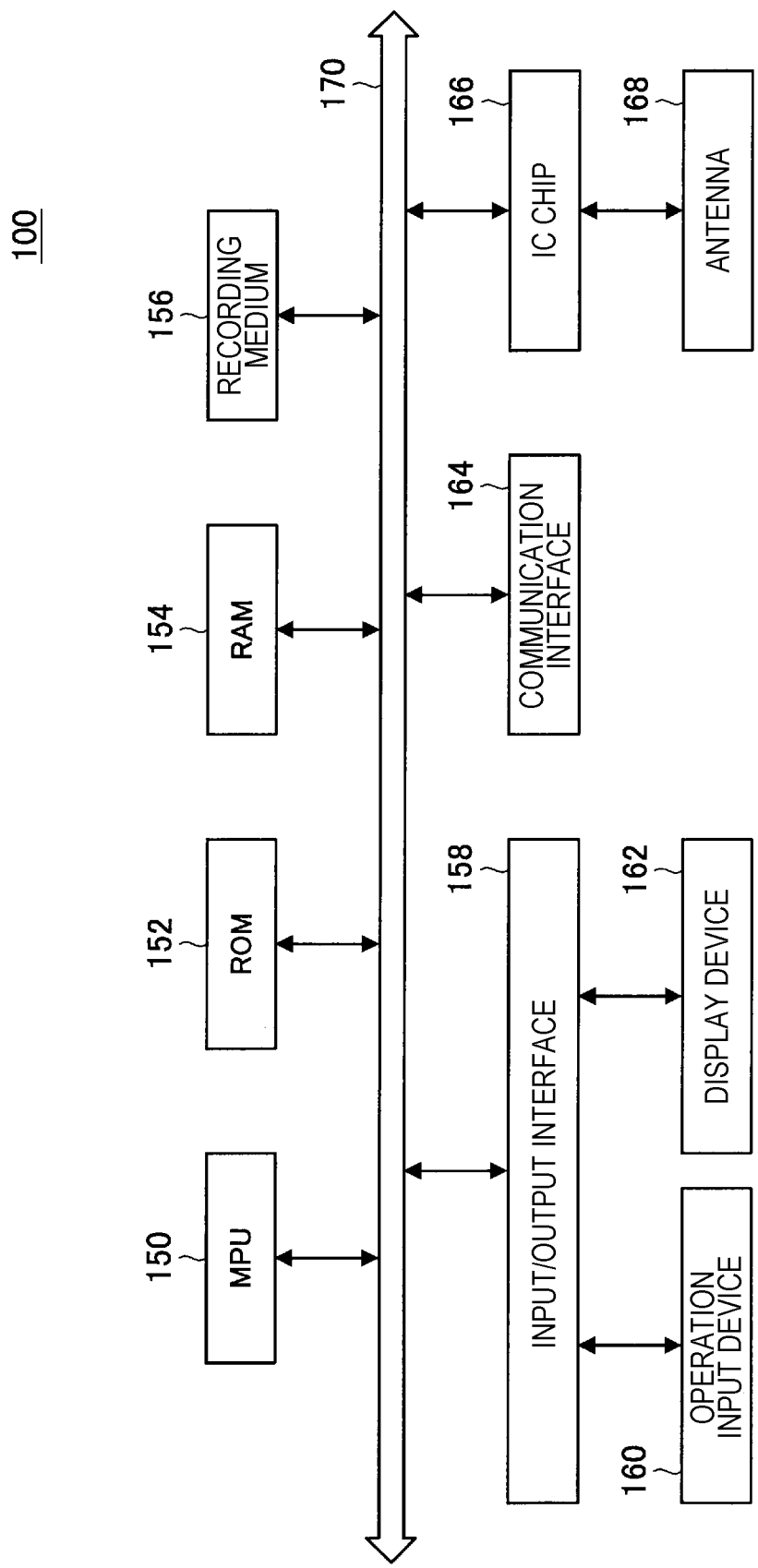
FIG. 12 is an illustration showing an example of a hardware configuration of the information processing device according to the present embodiment.

FIG. 12 is an illustration showing an example of a hardware configuration of the information processing device 100 according to the present embodiment. FIG. 12 shows an example of a hardware configuration of the information processing device 100 in a case where the data storage location is an IC chip adaptable to NFC.

The information processing device 100 includes an MPU 150, a ROM 152, a RAM 154, a recording medium 156, an input/output interface 158, an operation input device 160, a display device 162, a communication interface 164, an IC chip 166, and an antenna 168, for example. In addition, the information processing device 100 connects the respective structural elements with a bus 170 as a data transmission path, for example.

For example, the MPU 150 is configured with one or more than one processor configured with an arithmetic circuit such as a micro processing unit (MPU), various processing circuits, or the like, and functions as the control unit 104 that controls the information processing device 100 as a whole. Moreover, the MPU 150 plays a role of the access control unit 110 in the information processing device 100, for example. Note that the access control unit 110 may be configured with a dedicated (or general-purpose) circuit capable of implementing processing (such as a processor separate from the MPU 150, for example).

The ROM 152 stores control data such as programs and arithmetic parameters that the MPU 150 uses, and the like. The RAM 154 temporarily stores a program executed by the MPU 150 and the like, for example.

The recording medium 156 functions as the storage unit (not shown), and stores various data such as, for example, data related to the information processing method according to the present embodiment such as data acquired from the data storage location and a table in which details of an instruction and a priority are associated with each other, and various applications. Here, examples of the recording medium 156 include a magnetic recording medium such as a hard disk, a nonvolatile memory such as a flash memory, and the like. In addition, the recording medium 156 may be attachable/detachable to/from the information processing device 100.

The input/output interface 158 connects the operation input device 160 and the display device 162, for example. The operation input device 160 functions as the operating unit (not shown), and the display device 162 functions as the display unit (not shown). Here, examples of the input/output interface 158 include a universal serial bus (USB) terminal, a digital visual interface (DVI) terminal, a high-definition multimedia interface (HDMI) (registered trademark) terminal, various processing circuits, and the like.

Moreover, for example, the operation input device 160 is provided on the information processing device 100, and is connected to the input/output interface 158 in the inside of the information processing device 100. Examples of the operation input device 160 include a button, a direction key, and a rotary selector such as a jog dial, or a combination of them.

Furthermore, for example, the display device 162 is provided on the information processing device 100, and is connected to the input/output interface 158 in the inside of the information processing device 100. Examples of the display device 162 include a liquid crystal display and an organic electro-luminescence display (organic EL display; or also called an organic light emitting diode display (OLED display)).

Note that, as a matter of course, the input/output interface 158 can also connect to an external device such as an external operation input device (such as a keyboard or mouse, for example) or an external display device as an external device of the information processing device 100. In addition, the display device 162 may be a device capable of display and user operation, such as a touch panel, for example.

The communication interface 164 is communication means included in the information processing device 100, and functions as the communication unit 102 for performing a wireless or wired communication with an external device such as the server 300 via a network (or directly). Here, examples of the communication interface 164 include an communication antenna and a radio frequency (RF) circuit (wireless communication), an IEEE 802.15.1 port and a transmitting/receiving circuit (wireless communication), an IEEE 802.11 port and a transmitting/receiving circuit (wireless communication), or a LAN terminal and a transmitting/receiving circuit (wired communication).

The IC chip 166 and the antenna 168 correspond to an example of the data storage location according to the present embodiment. Note that the IC chip 166 may be integrally provided with the antenna 168.

The IC chip 166 and the antenna 168 perform a communication by NFC with the reader/writer 200 or an external device having a reader/writer function by means of carrier waves of a predetermined frequency such as 13.56 [MHz], for example. The antenna 168 plays a role of receiving carrier waves and transmitting a response signal. Moreover, the IC chip 166 demodulates and processes a carrier signal transmitted from an external device such as the reader/writer 200 on the basis of the received carrier waves, and transmits a response signal through load modulation.

Figure 13:
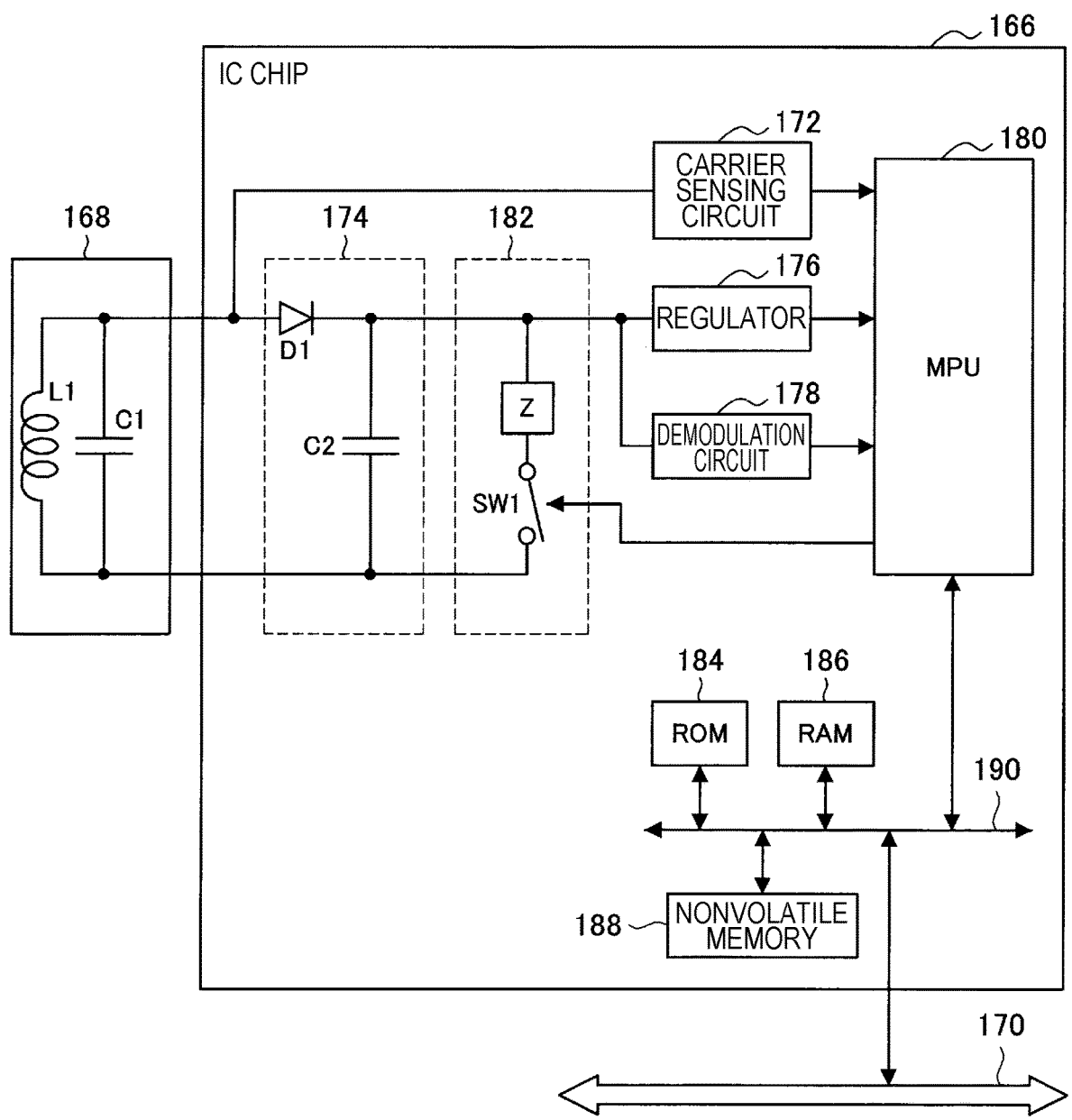
FIG. 13 is an illustration showing an example of a configuration of an IC chip and an antenna shown in FIG. 12.

FIG. 13 is an illustration showing an example of a configuration of the IC chip 166 and the antenna 168 shown in FIG. 12. Note that the information processing device 100 may not include the configuration of the IC chip 166 shown in FIG. 13, for example, in the form of an IC chip.

The antenna 168 is configured with a resonant circuit including a coil (inductor) L1 having a predetermined inductance and a capacitor C1 having a predetermined capacitance, for example, and generates an induced voltage through electromagnetic induction in response to reception of carrier waves. Then, the antenna 168 outputs a received voltage obtained by resonating the induced voltage at a predetermined resonance frequency. Here, the resonance frequency in the antenna 168 is set in conformity with the frequency of carrier waves such as 13.56 [MHz], for example. The antenna 168 receives carrier waves with the above-described configuration, and transmits a response signal through load modulation performed in a load modulation circuit 182 included in the IC chip 166.

The IC chip 166 includes a carrier sensing circuit 172, a detection circuit 174, a regulator 176, a demodulation circuit 178, an MPU 180, and the load modulation circuit 182. Note that, although not shown in FIG. 13, the IC chip 166 may further include a protection circuit (not shown) for preventing an overvoltage or overcurrent from being applied to the MPU 180, for example. Here, examples of the protection circuit (not shown) include a clamping circuit configured with a diode or the like.

The IC chip 166 also includes a ROM 184, a RAM 186, and a nonvolatile memory 188, for example. The MPU 180, the ROM 184, the RAM 186, and the nonvolatile memory 188 are connected with a bus 190 as a data transmission path, for example. In addition, the bus 190 is connected to the bus 170, and the MPU 150 in FIG. 12 and the IC chip 166 can communicate through a wired communication of any communication scheme, such as a communication based on the ISO 7816 standard, for example.

The ROM 184 stores control data such as programs and arithmetic parameters that the MPU 180 uses. The RAM 186 temporarily stores a program executed by the MPU 180, a computation result, an execution status, and the like.

The nonvolatile memory 188 stores various data such as, for example, non-secure data such as data indicative of value balance and history, secure data such as device information related to value change, and various applications. Here, examples of the nonvolatile memory 188 include an electrically erasable and programmable read only memory (EEPROM) and a flash memory. In addition, the nonvolatile memory 188 may have resistance to tampering, for example.

The carrier sensing circuit 172 generates a rectangular sensing signal, for example, on the basis of a received voltage transmitted from the antenna 168, and transmits the sensing signal to the MPU 180. Moreover, the MPU 180 uses the above-described transmitted sensing signal as a processing clock for data processing, for example. Here, the above-described sensing signal is based on the received voltage transmitted from the antenna 168, and therefore, will be synchronized with the frequency of carrier waves transmitted from an external device such as the reader/writer 200 (or a device that plays a role of a reader/writer). Therefore, the IC chip 166 can perform processing with an external device such as the reader/writer 200 in synchronization with the external device by including the carrier sensing circuit 172.

The detection circuit 174 rectifies the received voltage output from the antenna 168. Here, the detection circuit 174 is configured with a diode D1 and a capacitor C2, for example.

The regulator 176 smooths the received voltage into a constant voltage, and outputs a driving voltage to the MPU 180. Here, the regulator 176 uses a DC component of the received voltage as the driving voltage.

The demodulation circuit 178 demodulates a carrier signal on the basis of the received voltage, and outputs data corresponding to the carrier signal included in carrier waves (for example, a data signal binarized into a high level and a low level). Here, the demodulation circuit 178 outputs an AC component of the received voltage as data.

The MPU 180 is driven with the driving voltage output from the regulator 176, for example, used as a power source, and processes data demodulated in the demodulation circuit 178. Here, the MPU 180 is configured with one or more than one processor configured with an arithmetic circuit such as MPU, various processing circuits, or the like, for example.

In addition, the MPU 180 selectively generates a control signal that controls load modulation for a response to an external device such as the reader/writer 200 in accordance with a processing result. Then, the MPU 180 selectively outputs the control signal to the load modulation circuit 182.

The load modulation circuit 182 includes a load Z and a switch SW1, for example, and performs load modulation by selectively connecting (enabling) the load Z in accordance with the control signal transmitted from the MPU 180. Here, the load Z is configured with a resistor having a predetermined resistance, for example. In addition, the switch SW1 is configured with a p-channel metal oxide semiconductor field effect transistor (MOSFET) or an n-channel MOSFET, for example.

The IC chip 166 can process a carrier signal received by the antenna 168 with the configuration as described above, and can cause the antenna 168 to transmit a response signal through load modulation.

By having the configuration shown in FIG. 13, for example, the IC chip 166 and the antenna 168 perform a communication by NFC with an external device such as the reader/writer 200 using carrier waves of a predetermined frequency. In addition, the bus 190 included in the IC chip 166 is connected to the bus 170 shown in FIG. 12, and the MPU 150 in FIG. 12 and the IC chip 166 can communicate through a wired communication of any communication scheme, such as a communication based on the ISO 7816 standard, for example. In addition, the IC chip 166 and the antenna 168 can store data by having the configuration shown in FIG. 13, for example.

Thus, the IC chip 166 and the antenna 168 function as the data storage location according to the present embodiment by having the configuration shown in FIG. 13, for example. Note that, as a matter of course, the configuration of the IC chip 166 and the antenna 168 according to the present embodiment is not limited to the example shown in FIG. 13.

The information processing device 100 performs the above-described processing related to the information processing method according to the present embodiment with the configuration shown in FIG. 12, for example. Note that the hardware configuration of the information processing device 100 according to the present embodiment is not limited to the configuration shown in FIG. 12.

For example, the information processing device 100 may further include a carrier wave transmitting/receiving circuit electrically connected to the antenna 168, and may have a reader/writer function in NFC.

Moreover, for example, the information processing device 100 may not include the communication interface 164 in a case of performing a communication with an external device such as the server 300 via an external communication device being connected and in a case where it is not configured to perform a communication with an external device such as the server 300 as shown in FIG. 2. In addition, the communication interface 164 may have a configuration capable of performing a communication with one or more than one external device by a plurality of communication schemes.

Furthermore, the information processing device 100 can be configured such that the recording medium 156, the operation input device 160, and the display device 162 are not included, for example.

In addition, for example, the configuration shown in FIG. 12 (or a configuration according to a variation) may be implemented by one or more than one integrated circuit (IC).

With reference again to FIG. 11, an example of a configuration of the information processing device 100 will be described. The communication unit 102 is communication means included in the information processing device 100, and performs a wireless or wired communication with an external device such as the server 300 via a network (or directly). In addition, the communication unit 102 is controlled in communication by the control unit 104, for example.

Here, examples of the communication unit 102 include a communication antenna and an RF circuit as well as a LAN terminal and a transmitting/receiving circuit, but the configuration of the communication unit 102 is not limited to the foregoing. For example, the communication unit 102 can have a configuration adaptable to any standard capable of performing a communication, such as a USB terminal and a transmitting/receiving circuit, or any configuration capable of communicating with an external device via a network. In addition, the communication unit 102 may have a configuration capable of performing a communication with one or more than one external device by a plurality of communication schemes.

The control unit 104 is configured with an MPU or the like, for example, and plays a role of controlling the information processing device 100 as a whole. In addition, the control unit 104 includes the access control unit 110, for example, and plays a role of taking the initiative to perform the processing related to the information processing method according to the present embodiment.

The access control unit 110 plays a role of taking the initiative to perform the access control processing according to the present embodiment, and controls access to the data storage location.

The access control unit 110 controls access to the data storage location by performing any processing among the access control processing according to the first example shown in [1-1] described above to the access control processing according to the third example shown in [1-3] described above, for example.

The information processing device 100 performs the processing related to the information processing method according to the present embodiment (for example, the above-described access control processing) with the configuration shown in FIG. 11, for example.

Therefore, the information processing device 100 can reduce a collision of access to the data storage location in which data can be stored and which is accessed through each of a plurality of communications including a wired communication and a wireless communication, with the configuration shown in FIG. 11, for example.

Moreover, with the configuration shown in FIG. 11, for example, the information processing device 100 can provide effects provided when the processing related to the information processing method according to the present embodiment as described above is performed.

Note that the configuration of the information processing device according to the present embodiment is not limited to the configuration shown in FIG. 11.

For example, the information processing device according to the present embodiment can include the access control unit 110 shown in FIG. 11 separately from the control unit 104 (for example, implement by another processing circuit).

Moreover, as described above, the above-described access control processing is a division of the processing related to the information processing method according to the present embodiment, for the sake of convenience. Thus, the configuration for achieving the processing related to the information processing method according to the present embodiment is not limited to the access control unit 110 shown in FIG. 11, whilst it is possible to adopt a configuration implemented by a plurality of processors or the like in accordance with the manner of dividing the processing related to the information processing method according to the present embodiment, for example.

Furthermore, the information processing device according to the present embodiment may not include the communication unit 102 in a case of performing a communication with an external device such as the server 300 via an external communication device having a similar function and structure to the communication unit 102 and in a case where it is not configured to perform a communication with an external device such as the server 300 as shown in FIG. 2, for example.

In addition, the data storage location according to the present embodiment may be an external device connected to the information processing device according to the present embodiment through a wireless communication or a wired communication, for example.

The information processing device has been described above as the present embodiment, whilst the present embodiment is not limited to such a form. The present embodiment can be applied to various types of equipment capable of performing the processing related to the information processing method according to the present embodiment, such as, for example, a computer such as a personal computer (PC), a server, and the like, a communication device such as a mobile phone and a smartphone, and a tablet device. In addition, the present embodiment can also be applied to a processing IC that can be incorporated into equipment as described above, for example.

(Program According to the Present Embodiment)

When a program that causes a computer to function as the information processing apparatus according to the present embodiment (a program capable of executing the processing related to the information processing method according to the present embodiment such as the above-described access control processing, for example) is executed by a processor or the like in the computer, a collision of access to the data storage location in which data can be stored and which is accessed through each of a plurality of communications including a wired communication and a wireless communication can be reduced.

Moreover, when a program that causes a computer to function as the information processing apparatus according to the present embodiment is executed by a processor or the like in the computer, it is possible to provide an effect provided by the processing related to the information processing method according to the present embodiment described above.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it has been illustrated above that a program (computer program) that causes a computer to function as the information processing apparatus according to the present embodiment is provided, but the present embodiment can further provide a recording medium in which the above-described program is stored together.

The above-described configurations express examples of the present embodiment and, of course, pertain to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an access control unit configured to control access to a data storage location in which data can be stored and which is accessed through each of a plurality of communications including a wired communication and a wireless communication.

(2)

The information processing device according to (1), in which the access control unit collectively performs access to the data storage location by each of a plurality of applications.

(3)

The information processing device according to (2), in which the access control unit reads out data from the data storage location by access to the data storage location, and holds the readout data in a recording medium, and when a readout request to read out data from the data storage location is acquired from the application, and in a case where data corresponding to the readout request is held in the recording medium, provides the data held in the recording medium to the application.

(4)

The information processing device according to (3), in which the access control unit when the readout request is acquired from the application, and in a case where data corresponding to the readout request is not held in the recording medium, reads out data from the data storage location, and provides the data read out from the data storage location to the application.

(5)

The information processing device according to (4), in which in a case where a data transfer condition having been set is satisfied, the access control unit provides the data read out from the data storage location to the application.

(6)

The information processing device according to any one of (3) to (5), in which in a case where it is determined that a data acquisition condition having been set is satisfied, the access control unit reads out data from the data storage location.

(7)

The information processing device according to (6), in which the access control unit determines that the data acquisition condition is satisfied in a case where any of a lapse of a predetermined time, sensing of a predetermined event, and acquisition of a predetermined instruction is satisfied.

(8)

The information processing device according to (6) or (7), in which the data acquisition condition is set by the application.

(9)

The information processing device according to any one of (2) to (8), in which in a case where access requests that request access to the data storage location are acquired from the applications, the access control unit performs access to the data storage location based on the access requests in the order that the access requests have been acquired.

(10)

The information processing device according to any one of (2) to (9), in which in a case where access requests that request access to the data storage location are acquired from the plurality of applications in a predetermined period, the access control unit performs access to the data storage location based on the access requests in a priority order based on the access requests.

(11)

The information processing device according to any one of (1) to (10), in which the access control unit causes the data storage location to set a priority order of access in the plurality of communications.

(12)

The information processing device according to any one of (1) to (11), in which access to the data storage location controlled by the access control unit is one or both of reading out data stored in the data storage location and writing data into the data storage location.

(13)

An information processing device including:

an access control unit configured to control access to a data storage location in which data can be stored and which is accessed through each of a plurality of communications including a wired communication and a wireless communication, in which the access control unit causes the data storage location to set a priority order of access in the plurality of communications.

(14)

An information processing method executed by an information processing device, the method including:

a step of controlling access to a data storage location in which data can be stored and which is accessed through each of a plurality of communications including a wired communication and a wireless communication.

(15)

A program for causing a computer to execute:

a step of controlling access to a data storage location in which data can be stored and which is accessed through each of a plurality of communications including a wired communication and a wireless communication.

REFERENCE SIGNS LIST 10, 100 information processing device
20, 200 reader/writer
102 communication unit
104 control unit
110 access control unit
300 server

The invention claimed is:

1. An information processing device, comprising:
a data storage location that corresponds to one of an integrated circuit (IC) chip, a universal integrated circuit card (UICC), or a subscriber identity module (SIM) card;
a memory; and
an access control unit configured to:
receive a plurality of data requests from a plurality of applications via a wired communication;
determine a priority order of the plurality of data requests based on a plurality of instructions included in the plurality of data requests;
determine first data is not held in the memory based on a first time period between a time stamp corresponding to the first data and a current time, wherein
the first time period is equal to or longer than a specific time period, and
the first data corresponds to a first data request of the plurality of data requests;
transmit the first data request and a priority setting request to the data storage location based on the priority order and the determination that the first data is not held in the memory, wherein
the first data request includes a data acquisition condition and a data transfer condition,
the first data request corresponds to an application of the plurality of applications, and
the data storage location is configured to:
receive the first data request and the priority setting request from the access control unit via the wired communication;
receive a second data request from an external device via a near field communication, wherein the second data request is different from the plurality of data requests;
determine a priority of communication for each of the wired communication and the near field communication based on the priority setting request, wherein the priority of communication of the near field communication is higher than the priority of communication of the wired communication;
transmit, in a wireless processing mode, second data to the external device based on the priority of communication and the second data request;
switch from the wireless processing mode to a wired processing mode subsequent to the transmission of the second data; and
transmit, in the wired processing mode, the first data to the access control unit based on the data acquisition condition;
acquire the first data from the data storage location; and
transmit the first data to the application based on the data transfer condition.

2. The information processing device according to claim 1, wherein the access control unit is further configured to:
store the first data acquired from the data storage location in the memory;
acquire a readout request from the application of the plurality of applications;
read the first data from the memory based on the acquired readout request; and
transmit the read first data to the application of the plurality of applications.

3. The information processing device according to claim 2, wherein the access control unit is further configured to set the data acquisition condition based on the first data request.

4. The information processing device according to claim 3, wherein the data acquisition condition includes at least one of a lapse of a second time period, detection of an event, or an acquisition of an instruction.

5. The information processing device according to claim 4, wherein the event includes one of activation of the information processing device, transmission of a radio frequency by the external device, activation of the application of the plurality of applications, an addition of the first data in the data storage location, or a deletion of the first data in the data storage location.

6. The information processing device according to claim 4, wherein the event corresponds to a location of the information processing device.

7. The information processing device according to claim 1, wherein the access control unit is further configured to:
acquire a readout request as the first data request from the application of the plurality of applications; and
acquire the first data from the data storage location based on the acquired readout request.

8. The information processing device according to claim 7, wherein the access control unit is further configured to set the data transfer condition based on the first data request.

9. The information processing device according to claim 1, wherein the data acquisition condition is set by the application of the plurality of applications.

10. The information processing device according to claim 1, wherein the access control unit is further configured to transmit the plurality of data requests from the plurality of applications to the data storage location, based on an order of the reception of the plurality of data requests from the plurality of applications.

11. The information processing device according to claim 1, wherein the access control unit is further configured to receive the plurality of data requests in a second time period.

12. The information processing device according to claim 1, wherein the first data request corresponds to at least one of a readout request or a writing request.

13. The information processing device according to claim 1, wherein the access control unit is further configured to process the first data request of the plurality of data requests based on a threshold value associated with the priority of communication.

14. An information processing method, comprising:
in an information processing device that includes a data storage location, a memory, and an access control unit, wherein the data storage location corresponds to one of an integrated circuit (IC) chip, a universal integrated circuit card (UICC), or a subscriber identity module (SIM) card:
receiving, by the access control unit, a plurality of data requests from a plurality of applications via a wired communication;
determining, by the access control unit, a priority order of the plurality of data requests based on a plurality of instructions included in the plurality of data requests;

determining, by the access control unit, first data is not held in the memory based on a time period between a time stamp corresponding to the first data and a current time, wherein
 the time period is equal to or longer than a specific time period, and
 the first data corresponds to a first data request of the plurality of data requests;
transmitting, by the access control unit, the first data request and a priority setting request to the data storage location based on the priority order and the determination that the first data is not held in the memory, wherein
 the first data request includes a data acquisition condition and a data transfer condition, and
 the first data request corresponds to an application of the plurality of applications;
receiving, by the data storage location, the first data request and the priority setting request from the access control unit via the wired communication;
receiving, by the data storage location, a second data request from an external device via a near field communication, wherein the second data request is different from the plurality of data requests;
determining, by the data storage location, a priority of communication for each of the wired communication and the near field communication based on the priority setting request, wherein the priority of communication of the near field communication is higher than the priority of communication of the wired communication;
transmitting, by the data storage location in a wireless processing mode, second data to the external device based on the priority of communication and the second data request;
switching, by the data storage location, from the wireless processing mode to a wired processing mode subsequent to the transmission of the second data;
transmitting, by the data storage location in the wired processing mode, the first data to the access control unit based on the data acquisition condition;
acquiring, by the access control unit, the first data from the data storage location; and
transmitting, by the access control unit, the first data to the application based on the data transfer condition.

15. A non-transitory computer-readable medium having stored thereon computer-executable instructions, which when executed by an information processing device, causes the information processing device to execute operations, the operations comprising:
 receiving, by an access control unit of the information processing device, a plurality of data requests from a plurality of applications via a wired communication;
 determining, by the access control unit, a priority order of the plurality of data requests based on a plurality of instructions included in the plurality of data requests;
 determining, by the access control unit, first data is not held in a memory of the information processing device based on a time period between a time stamp corresponding to the first data and a current time, wherein
  the time period is equal to or longer than a specific time period, and
  the first data corresponds to a first data request of the plurality of data requests;
 transmitting, by the access control unit, the first data request and a priority setting request to a data storage location of the information processing device based on the priority order and the determination that the first data is not held in the memory, wherein
  the data storage location corresponds to one of an integrated circuit (IC) chip, a universal integrated circuit card (UICC), or a subscriber identity module (SIM) card,
  the first data request includes a data acquisition condition and a data transfer condition, and
  the first data request corresponds to an application of the plurality of applications;
 receiving, by the data storage location, the first data request and the priority setting request from the access control unit via the wired communication;
 receiving, by the data storage location, a second data request from an external device via a near field communication, wherein the second data request is different from the plurality of data requests;
 determining, by the data storage location, a priority of communication for each of the wired communication and the near field communication based on the priority setting request, wherein the priority of communication of the near field communication is higher than the priority of communication of the wired communication;
 transmitting, by the data storage location in a wireless processing mode, second data to the external device based on the priority of communication and the second data request;
 switching, by the data storage location, from the wireless processing mode to a wired processing mode subsequent to the transmission of the second data;
 transmitting, by the data storage location in the wired processing mode, the first data to the access control unit based on the data acquisition condition;
 acquiring, by the access control unit, the first data from the data storage location; and
 transmitting, by the access control unit, the first data to the application based on the data transfer condition.

* * * * *